US 7,761,436 B2

(12) United States Patent
Norton et al.

(10) Patent No.: US 7,761,436 B2
(45) Date of Patent: Jul. 20, 2010

(54) APPARATUS AND METHOD FOR CONTROLLING CONTENT ACCESS BASED ON SHARED ANNOTATIONS FOR ANNOTATED USERS IN A FOLKSONOMY SCHEME

(75) Inventors: Kenneth Norton, San Carlos, CA (US); Chung-Man Tam, San Francisco, CA (US); Jianchang Mao, San Jose, CA (US); Zhichen Xu, San Jose, CA (US); Adrienne Bassett, San Francisco, CA (US); Ashley Hall, Menlo Park, CA (US); Nathan Arnold, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 776 days.

(21) Appl. No.: 11/325,254

(22) Filed: Jan. 3, 2006

(65) Prior Publication Data

US 2007/0156636 A1    Jul. 5, 2007

(51) Int. Cl.
*G06F 7/00*   (2006.01)
(52) U.S. Cl. .................................... 707/705
(58) Field of Classification Search ............. 707/1
See application file for complete search history.

(56) References Cited

U.S. PATENT DOCUMENTS

| 2003/0050927 | A1* | 3/2003 | Hussam ................... 707/5 |
| 2005/0160167 | A1* | 7/2005 | Cheng et al. ............. 709/224 |
| 2005/0216457 | A1* | 9/2005 | Walther et al. ............ 707/4 |
| 2005/0256867 | A1* | 11/2005 | Walther et al. ........... 707/5 |
| 2006/0242574 | A1* | 10/2006 | Richardson et al. ...... 715/530 |

* cited by examiner

*Primary Examiner*—Charles Rones
*Assistant Examiner*—Fazlul Quader
(74) *Attorney, Agent, or Firm*—Seth H. Ostrow; Ostrow Kaufman & Frankl LLP

(57) ABSTRACT

A method for sharing content with a user includes receiving from a user a first set of keywords for annotating an annotated user; receiving from the user a second set of keywords that designate whether annotated content annotated by at least one keyword included in the second set of keywords may be shared with the annotated user; storing in a data store a first association of the first set of keywords with the annotated user, and a second association of the second set of keywords with the annotated user; receiving a keyword selection for a select keyword and an identifier for the annotated user; and displaying on the client system content annotated by the select keyword if the annotated user is annotated by at least one keyword in the first set of keywords, and if the select keyword is included in the second set of keywords.

19 Claims, 22 Drawing Sheets

300

302

306
Author ID: *user42*

308
URL: *http://www.domain.tld/adir/*

310
Host Flag: *Page*

312
Title: *Chinese Food Directory*

314
Abstract: *Index Sunnyvale's best Chinese restaurants*

316
Referral: *q=chinese+food+sunnyvale*

318
Old Referral:

320
Last Updated: *2004-02-01 00:01:02*

322
Last Visited: *2004-02-21 21:04:04*

304

324
Keywords: *chinese, food, local*

326
Description: *Best list I've found for Chinese food in Sunnyvale. Has great reviews.*

328
Rating: *+2*

352
- 356 Author ID: user A
- 358 Annotated User ID: user B
- 358 Annotated User Information: e-mail
- 360 Trust Network ID: Bicycle Club
- 362 Last Updated: 2005-02-01 01:01:02
- 364 Last Visited: 2004-05-11 12:06:06

354
- 366 Keywords: road cyclist, work, bowling
- 368 Description: Very strong rider
- 370 Rating: +2
- 372 Shared Keywords: mountain biking, San Francisco
- 374 Blocking Keywords: fishing

FIG. 3B

My Saved Pages

- restaurant
- shopping
- cable car
- art
- map
- museum
- alcatraz
- baseball
- earthquakes
- science

}— 405

My Friends (view · add) who have pages tagged as san francisco

- Lisa
- Michael

— 415

View all friends
Add friends

Shared by Other Users Keywords

San Francisco Museum }— 410

Shared Content / > san francisco / 425c  /430
425a                              425b

| ☐ | Email | Instant Message | Phone Message | Filter Communication | Delete |

☐ best of san francisco guide
Saved by me as san francisco
http://domain9.com/
[Subscribe] — 450

☐ Map of Golden Gate Park
Saved by me as san francisco, map
http://domain10.com/map/whatever
[Subscribe] — 450

☐ San Francisco Giants : Schedule : 2005 Giants Schedule
Saved by me as baseball, san francisco
http://domain11.com/giants/schedule.asp
[Subscribe] — 450

☐ San Francisco Muni - Cable Car Schedule
Saved by me as san francisco, cable car
http://domain12.com/home.htm
[Subscribe] — 450

☐ San Francisco Cable Car
Saved by me as san francisco, cable car
http://domain13.org/
[Subscribe] — 450

☐ Map of San Francisco, CA by MapQuest
Saved by me as map, san francisco
http://domain14.com/maps/getmap
[Subscribe] — 450

☐ Recent Earthquakes for San Francisco
Saved by me as earthquakes, san francisco
http://domain15.com/maps/SF_Bay.html
[Subscribe] — 450

Next | Previous       420

FIG. 4B

Search Results

Search [ chinese food sunnyvale ] [Submit]

The Best and the worst of CA
... Decent (and cheap) Chinese food. ------ on South Main street in Yreka, CA ... Decent, but expensive Chinese food. -------- in Sunnyvale on El Camino Real, CA ...
http://www.somedomain.tld/pagewhatever.htm Rate This: [ 👍 ] [ none ] [ 👎 ]  ← 1000
      1004   1006   1008 low carb chinese food Resources
Your Low Carb. Web Directory and Resources. Sponsored Links. One low carb diet plan that always works. Have diets failed you in the past? ... ------.com - Authentic & healthy Chinese food cooking recipes. Over 500+ FREE low carb low fat ...
http://www.somedomain2.tld/dir2/thispageiscool.htm Rate This: [ 👍 ] [ none ] [ 👎 ]

Chinese Food Directory
... An index of Chinese food in your local area ... Sunnyvale CA -- Chinese ...
http://www.domain.tld/edir Rate This: [ 👍 ] [ none ] [ 👎 ]

Food
... ---- El Camino Real, Sunnyvale (and other locations)... This is probably the worst Chinese food I've ever had ...
http://somedomain.tld/dir2/this.htm Rate This: [ 👍 ] [ none ] [ 👎 ]

Search Results ← 1200

Search: chinese food sunnyvale [Submit]

My Results

Chinese Food Directory
... An index of Chinese food in your local area ... Sunnyvale CA -- Chinese ...
http://www.domain.tld/edir
[Show My Comments]

Web Results

The Best and the worst of CA
... Decent (and cheap) Chinese food, ------- on S
but expensive Chinese food, --------- in Sunnyvale on E
http://www.somedomain.tld/pagewhatever.htm
[Save This]

low carb chinese food Resources
Your Low Carb. Web Directory and Resources. Spon
always works. Have diets failed you in the past? ... -------
cooking recipes. Over 500+ FREE low carb low fat ...
http://www.somedomain2.tld/dir2/thispageiscool.htm
[Save This]

Title: Chinese Food Directory

Keywords: chinese, food, local

Description: Best list I've found for Chinese food in Sunnyvale. Has great reviews. ← 1302

Rating: ☼ /1304     /1308
[Edit]   [Close]

\ 1300

Chinese Food Directory
... An index of Chinese food in your local area ... Sunnyvale CA -- Chinese ...
http://www.domain.tld/edir
[Show My Comments]

Food
... ----- El Camino Real, Sunnyvale (and other locations)... This is probably the worst
Chinese food I've ever had ...
http://somedomain.tld/dir2/this.htm
[Show My Comments]

FIG. 13

APPARATUS AND METHOD FOR CONTROLLING CONTENT ACCESS BASED ON SHARED ANNOTATIONS FOR ANNOTATED USERS IN A FOLKSONOMY SCHEME

CROSS-REFERENCES TO RELATED APPLICATIONS

This application claims the benefit of U.S. Provisional Patent Application No. 60/614,232, filed Sep. 28, 2004, entitled "Search Systems and Methods with Integration of User Judgments" the disclosure of which is incorporated herein by reference for all purposes.

FIELD OF THE INVENTION

The present invention relates in general to apparatus and methods for annotating content, and in particular, to an apparatus and method for suggesting annotations that are included in an annotation canon.

BACKGROUND OF THE INVENTION

The World Wide Web (Web) provides a large collection of interlinked information sources (in various formats including documents, Images, and media content) relating to virtually every subject imaginable. As the Web has grown, the ability of users to search this collection and identify content relevant to a particular subject has become increasingly important, and a number of search service providers now exist to meet this need. In general, a search service provider publishes a web page via which a user can submit a query indicating what the user is interested in. In response to the query, the search service provider generates and transmits to the user a list of links to Web pages or sites considered relevant to that query, typically in the form of a "search results" page.

Query response generally involves the following steps. First, a pre-created index or database of Web pages or sites is searched using one or more search terms extracted from the query to generate a list of hits (usually target pages or sites, or references to target pages or sites, that contain the search terms or are otherwise identified as being relevant to the query). Next, the hits are ranked according to predefined criteria, and the best results (according to these criteria) are given the most prominent placement, e.g., at the top of the list. The ranked list of hits is transmitted to the user, usually in the form of a "results" page (or a set of interconnected pages) containing a list of links to the hit pages or sites. Other features, such as sponsored links or advertisements, may also be included on the results page.

Ranking of hits is often an important factor in whether a user's search ends in success or frustration. Frequently, a query will return such a large number of hits that it is impossible for a user to explore all of the hits in a reasonable time. If the first few links a user follows fail to lead to relevant content, the user will often give up on the search and possibly on the search service provider, even though relevant content might have been available farther down the list.

To maximize the likelihood that relevant content will be prominently placed, search service providers have developed increasingly sophisticated page ranking criteria and algorithms. In the early days of Web search, rankings were usually based on number of occurrences and/or proximity of search terms on a given page. This proved inadequate, and algorithms in use today typically incorporate other information, such as the number of other sites on the Web that link to a given target page (which reflects how useful other content providers think the target page is), in addition to the presence of search terms on the page. One algorithm allows querying users to provide feedback by rating the hits that are returned. The user's ratings are stored in association with the query, and previous positive ratings are used as a factor in ranking hits the next time the same query is entered by any user.

Existing algorithms, however, fail to take into account differences between individual users. For example, two users who enter the same query could actually be interested in different things; a page or site that is relevant to one user might not be relevant to another. In addition, users may have personal preferences, e.g., regarding how content is organized and displayed, which content providers they trust, and so on, that will affect how they evaluate or rate a given site. Thus, a site that satisfies one user (or many users) might not satisfy the next user who enters the same query, and that user might still give up in frustration.

Another tool for helping individual users find content of interest to them is "bookmarking." Traditionally, bookmarking has been implemented in Web browser programs, and while viewing any page, the user can elect to save a bookmark for that page. The bookmark usually includes the URL (uniform resource locator) for the page, a title, and possibly other information such as when the user visited the page or when the user created the bookmark. The Web browser program maintains a list of bookmarks, and the user can navigate to a bookmarked page by finding the page in his list of bookmarks. To simplify the task of navigating a list of bookmarks, most bookmarking tools allow users to organize their bookmarks into folders. More recently, some Internet-based information services have implemented bookmarking tools that allow a registered user to create and access a personal list of bookmarks from any computer connected to the Internet.

While bookmarking can be helpful, this tool also has its limitations. For instance, organizing bookmarks into folders typically requires substantial user effort, and even with folders, it can be difficult for a user to remember which bookmarked page had a particular item of information that the user might be looking for at a given time. Also, existing bookmarking tools generally do not help the user identify whether he has already bookmarked a given page, nor do they provide any facilities for searching bookmarked information.

Thus, it would be desirable to provide improved tools for helping individual users annotate content wherein the annotations can be used to later retrieve the content by the user or others with whom the user's chooses to share her annotations.

BRIEF SUMMARY OF THE INVENTION

Embodiments of the present invention provide an apparatus and a method allowing users to annotate content items identified in a document corpus (e.g., the World Wide Web), and other users who are in the user trust network of users. As used herein, the term "annotation" refers generally to any descriptive and/or evaluative metadata related to a document (e.g., a Web page or site) or other users collected from a user and thereafter stored in association with that user. In embodiments of the present invention, annotations may include various fields of metadata, such as a rating (which may be favorable or unfavorable) of the document or other user, a set of keywords identifying a topic (or topics) of the document or other users, a free-text description of the document or other users, and/or other fields. A set as referred to herein includes one or more elements. An annotation is advantageously collected from a user of the corpus and stored in association with an identifier of the user who created the annotation and an identifier of the document (or other content item) or other users to which it relates.

In one embodiment, a method for sharing annotated content with an annotated user includes receiving from a user a first set of keywords for annotating an annotated user, and receiving from the user a second set of keywords that designate whether annotated content annotated by at least one keyword included in the second set of keywords may be shared with the annotated user. A first association of the first set of keywords with the annotated user is stored in a data store. A second association of the second set of keywords with the annotated user is also stored in the data store. A keyword selection for a select keyword and an identifier for the annotated user if received via a client system that is associated with the annotated user. Thereafter, the first and second associations are retrieved from the data store. Based on the first association and the identifier, a determination is made as to whether the annotated user is annotated by at least one keyword in the first set of keywords. Based on the second association a determination is made as to whether the select keyword is included in the second set of keywords. The content annotated by the select keyword is displayed on the client system if the annotated user is annotated by at least one keyword in the first set of keywords, and if the select keyword is included in the second set of keywords.

According to a specific embodiment, the method further includes receiving from the user a third set of keywords that designate that annotated content annotated by at least one keyword included in the second set of keywords may be shared with the annotated user via selection of a keyword in the second set of keywords.

According to another specific embodiment, the method further includes receiving from the user a third set of keywords that designate that annotated content annotated by at least one keyword included in the second set of keywords may not be shared with the annotated user via selection of a keyword in the second set of keywords.

According to another embodiment, a method for transmitting a communication to a set of annotated users includes displaying a first keyword that annotates a first set of annotated users, and displaying a second keyword that annotates a second set of annotated users, wherein the first set and the second set include a union of annotated users annotated by the first keyword and the second keyword. A request is received to transmit a communication to the first set of annotated users via selection of a first keyword, and a request is received not to transmit the communication to the union of annotated users via selection of the second keyword. The communication is thereafter transmitted to the first set of annotated users exclusive of the union of annotated users.

According to another embodiment, a method for subscribing a page to annotated content includes receiving from a first user a first set of keywords for annotating a second user, and receiving from the first user a second set of keywords that designate whether annotated content annotated by at least one keyword included in the second set of keywords may be shared with the second user. A keyword selection is received for a select keyword that annotates a select piece of content; the selection is received via a client system that is associated with the second user. A request to subscribe to annotated content annotated by the select keyword is further received via the client system. Thereafter, a page associated with the second user is subscribed to the select piece of content annotated by the select keyword if the second user is annotated by at least one keyword in the first set of keywords and if the select keyword is in the second set of keywords.

According to a specific embodiment, the method further includes determining whether the second user is annotated by at least one keyword in the first set of keywords, and whether the select keyword is in the second set of keywords. The select piece of content that is annotated by the select keyword includes syndicated content, such as RSS feed. The method further includes displaying a syndication feed for the select piece of content on the page if the second user visits the page.

The following detailed description together with the accompanying drawings will provide a better understanding of the nature and advantages of the present invention.

BRIEF DESCRIPTION OF THE DRAWINGS

FIG. 3A is a schematic representation of an annotation record according to an embodiment of the present invention.

FIG. 3B is a schematic representation of an annotation record according to another embodiment of the present invention.

FIG. 4B is an illustration of another annotation navigation page according to another embodiment of the present invention.

FIG. 10 is an example of a search result page according to another embodiment of the present invention.

FIG. 13 is an example of a page overlay displaying an annotation according to an embodiment of the present invention.

DETAILED DESCRIPTION OF THE INVENTION

Figure 1:
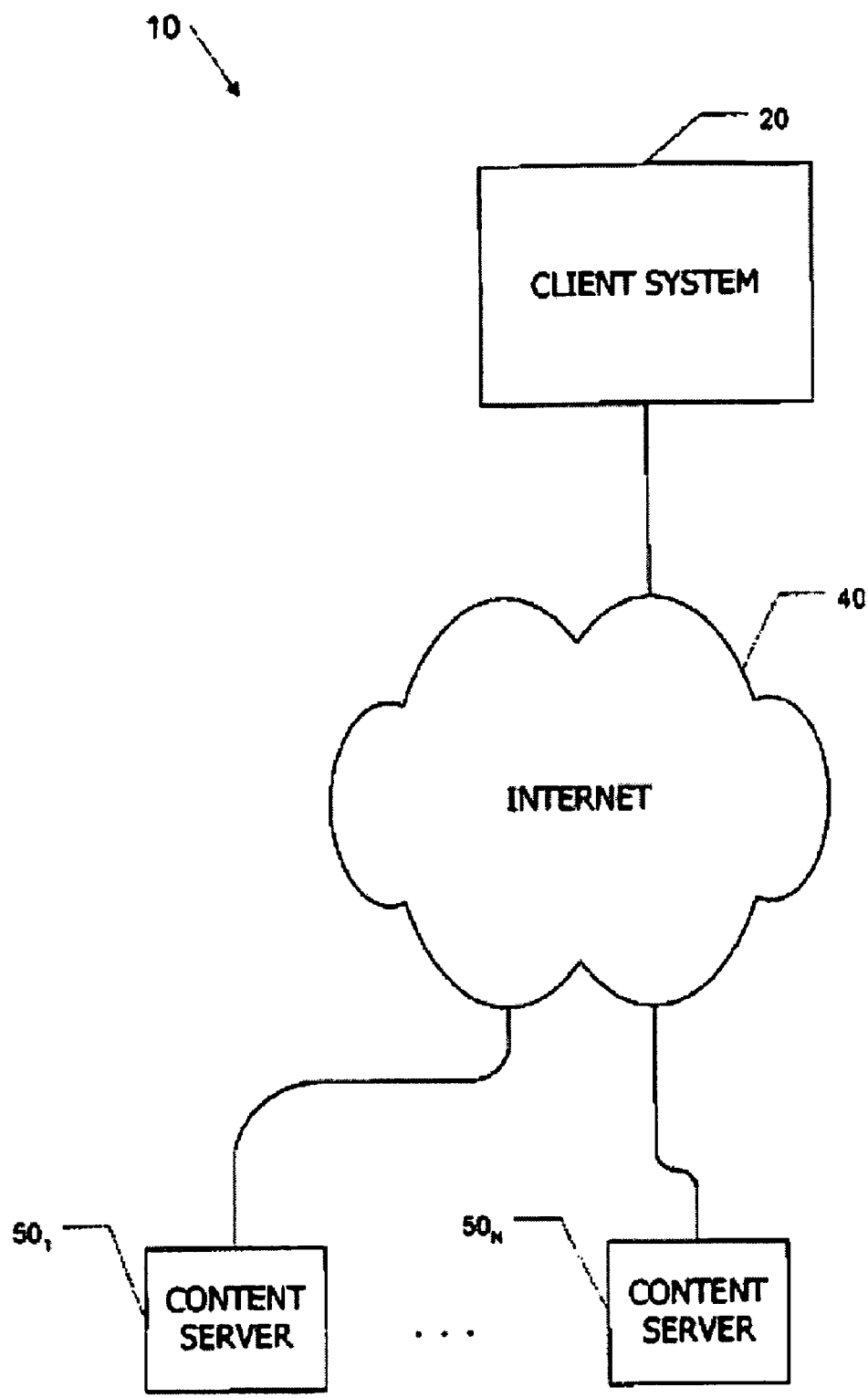
FIG. 1 is a block diagram of an information retrieval and communication network according to an embodiment of the present invention.

Embodiments of the present invention provide systems and methods allowing users to annotate content items, such as items found in a corpus of documents, items on the World Wide Web, users, such as users included in a trust network. As used herein, the term "annotation" refers generally to any descriptive and/or evaluative metadata related to a user (sometimes referred to as an annotated user) or a document (e.g., a Web page or site) that is collected from another user and thereafter stored in association with the other user. In embodiments of the present invention, annotations may include various fields of metadata, such as a rating (which may be favorable or unfavorable) of the document or the annotated user, a list of keywords identifying a topic (or topics) of the document or that describe the annotated user, a free-text description of the document or annotated user, and/or other fields. An annotation is advantageously collected from a user of the corpus and stored in association with an identifier of the user who created the annotation and an identifier of the document (or other content item) to which it relates or to the annotated user to which it relates.

In one embodiment, a user viewing a search results page is able to annotate the search hits and save the annotations. In another embodiment, a user can create and save an annotation for any page or site she visits. In another embodiment, a given user can create and save an annotation for another user, such as a user in the given user's trust network. In still other embodiments, stored annotations can be used in various ways to enhance and personalize search and browsing operations. For example, when the user searches the corpus, any hits corresponding to pages that the user has annotated (referred to herein as "annotated hits") can be highlighted, with a link being provided to allow the user to view her annotation. Where the annotation includes judgment data such as a numerical rating, the annotated hit can be highlighted to indicate whether the user's judgment was favorable or unfavorable. The ratings can also be used for ranking search results in response to the user's queries, with favorable judgments tending to increase the ranking of a given page or site and unfavorable judgments tending to decrease the ranking. Where the annotation includes user-supplied free text and/or descriptive keywords or labels, the user may have the option to search her annotations in addition to or instead of page content. In other embodiments, any time the user visits a page she has annotated, a control is provided allowing the user to view and/or edit her annotation.

For purposes of illustration, the present description and drawings may make use of specific queries, search result pages, URLs, and/or Web pages. Such use is not meant to imply any opinion, endorsement, or disparagement of any actual Web page or site. Further, it is to be understood that the invention is not limited to particular examples illustrated herein.

I. Overview

A. Network Implementation Overview

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's INTERNET EXPLORER™ browser, NETSCAPE NAVIGATOR™ browser, MOZILLA™ browser, OPERA™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internet work of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel PENTIUM™ processor, AMD ATHLON™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like, Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search and Annotation System Overview

Figure 2A:
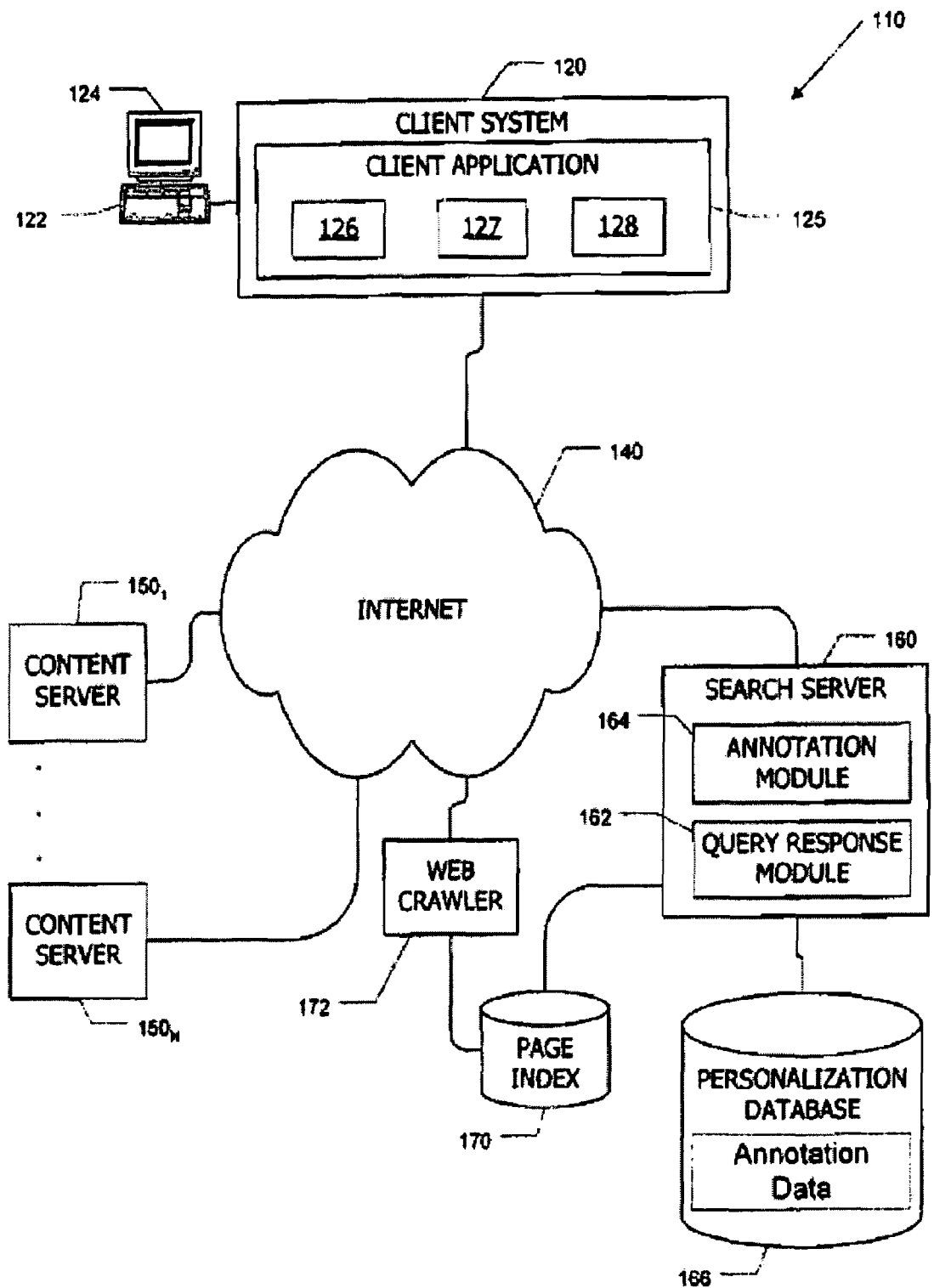
FIG. 2A is a block diagram of an information retrieval and communication network according to another embodiment of the present invention.

FIG. 2A illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As described above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as described above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of applications executing on client system 120 with which application interface module 128 is preferably configured to interface according to aspects of the present invention include various e-mail applications, instant messaging (IM) applications, browser applications, document management applications and others. Further, user interface module 127 may include a browser, such as a default browser configured on client system 120 or a different browser.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system includes a query response module 162 configured to receive a query from a user and generate search result data therefore, as well as a user annotation module 164 configured to detect and respond to user interaction with the search result data as described below.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented in search server system 160 or in a separate system (e.g., web crawler 172) that generates a page index 170 and makes it available to search server system 160. Various page index implementations and formats are known in the art and may be used for page index 170.

Query response module 162 in one embodiment also references a personalization database 166. Personalization database 166, which may be implemented using conventional database technologies, includes user-specific information, in particular records of user-supplied annotations for various Web pages or sites. As described below, the annotations can include any type of user-supplied metadata including descriptive and/or evaluative information; the metadata might include free text, keywords or labels, numerical ratings reflecting a user judgment (e.g., favorable or unfavorable) as to the merits of particular Web pages or sites, and so on. Examples of content and formats for annotations and techniques for collecting annotations to be stored in personalization database 166 are described below.

Query response module 162 is configured to provide data responsive to various search requests (queries) received from a client system 120, in particular from search module 126. As used herein, the term "query" encompasses any request from a user (e.g., via client 120) to search server 160 that can be satisfied by searching the Web (or other corpus) indexed by page index 170. In one embodiment, a user is presented with a search interface via search module 126. The interface may include a text box into which a user may enter a query (e.g., by typing), check boxes and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of the search terms in the query; context identifiers associated with query terms and/or particular pages or sites; page sponsorship; connectivity data collected from multiple pages; etc.). For example, query response module 162 may parse a received query to extract one or more search terms, then access page index 170 using the search terms, thereby generating a list of "hits", i.e., pages or sites (or references to pages or sites) that are determined to have at least some relevance to the query. Query response module 162 may then rank the hits using one or more ranking algorithms. Particular algorithms for identifying and ranking hits are not critical to the present invention, and conventional algorithms may be used.

In embodiments of the present invention, query response module 162 is also configured to retrieve from personalization database 166 any annotation data associated with the user who entered the current query and to incorporate such annotation data into the search results. For example, where at least some of the annotations include ratings (or other data reflecting a user's evaluation of the page or site), query response module 162 might generate a separate list of "favored" results based on favorable user ratings of particular pages or sites previously annotated by that user; or query response module 162 might incorporate the user's ratings of particular pages of sites in the ranking of search results; or query response module 162 might use unfavorable user ratings of particular pages or sites to determine whether to drop a hit from the list of results. Where the annotations include free text, keywords or labels, the appearance of a search term in any of these elements may be considered during identification and/or ranking of search hits.

User annotations may be provided to personalization database 166 in various ways. In some embodiments, search result data is presented as a results page including a list of hits. For each hit, the results page may include, e.g., a page or site title, a link to the page or site, one or more excerpts from the content of that page or site (e.g., showing the context in which search terms occur), and other options, such as a link to a cached copy of the content. The result data may also include buttons or other interface elements allowing the user to annotate any of the hit pages or sites. For example, the user can be invited to rate the page or site on a predefined scale (e.g., thumbs-up or thumbs-down, zero to four stars, numerical ratings from 1 to 10, etc.), to enter a free-text description of the page or site, to select labels describing the page or site from a predefined list, or to enter one or more keywords to describe the page or site.

When the user elects to annotate a hit page or site, user annotation module 164 receives the new annotation data from the user (e.g., via client system 120) and updates personalization database 166. In one embodiment, user annotation module 164 also initiates an automatic refresh of the results page in response to the new annotation data. During this refresh operation, the hits listed on the results page may be re-ranked using the new data, and an updated results page reflecting the new rankings is transmitted to the user. In cases where the new annotation includes a favorable rating, the new page may also list the newly annotated site among the "favored" results. Accordingly, the user's new annotations can have an immediate effect on the displayed results of the current search, as well as being stored for use in processing future queries from that user.

To enable search personalization features such as user annotations, search server 160 advantageously provides a user login feature, where "login" refers generally to any procedure for identifying and/or authenticating a user of a computer system. Numerous examples are known in the art and may be used in connection with embodiments of the present invention. For instance, in one embodiment, each user has a unique user identifier (ID) and a password, and search server 160 prompts a user to log in by delivering to client 120 a login page via which the user can enter this information. In other embodiments, biometric, voice, or other identification and authentication techniques may also be used in addition to or instead of a user ID and password. Once the user has identified herself, e.g., by logging in, the user can enter and/or update her annotations by interacting with user annotation module 164 as described below. Further, each query entered by a logged-in user can be associated with the unique user ID for that user; based on the user ID, query response module 162 can access personalization database 166 to incorporate the user's stored annotations into responses to that user's queries. User login is advantageously persistent, in the sense that once the user has logged in (e.g., via client application 125), the user's identity can be communicated to search server 160 at any appropriate time while the user operates client application 125. Thus, personalization features described herein can be made continuously accessible to a user.

In addition to using the user's own annotations in responding to a query, query response module 162 may also use aggregate information about other users' annotations. For example, in one embodiment, an aggregate rating (e.g., an average rating) for a page or site is computed from the ratings of every user who has provided an annotation with a rating for that page or site. In another embodiment, aggregate keywords or labels describing a page or site may be determined, e.g., by identifying those keywords or labels that have most frequently been applied to that page or site by the users who have annotated it. Such aggregate annotations for a given page may be stored, e.g., in page index 170, and used by query response module 162 to rank hits in response to a query, regardless of whether the user is known to search server 160.

In one embodiment, user annotation module 164 forwards new annotation data as it is received to an aggregator module (not shown in FIG. 2A) that updates the aggregate annotation data stored in page index 170. Aggregate annotation data may be updated at regular intervals, e.g., daily or hourly, or approximately in real time. Collection and use of aggregate annotation data are described further below.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably. In addition, the query response module and user annotation module described herein may be implemented on the same server or on different servers.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of various page information). In addition, while the search server system is described as including a particular combination of component modules, it is to be understood that a division into modules is purely for convenience of description; more, fewer, or different modules might be defined.

In addition, in some embodiments, some modules and/or metadata described herein as being maintained by search server 160 might be wholly or partially resident on a client system. For example, some or all of a user's annotations could be stored locally on client system 120 and managed by a component module of client application 125. Other data, including portions or all of page index 170, could be periodically downloaded from search server 160 and stored by client system 120 for subsequent use. Further, client application 125 may create and manage an index of content stored locally on client 120 and may also provide a capability for searching locally stored content, incorporate search results including locally stored content into Web search results, and so on. Thus, search operations may include any combination of operations by a search server system and/or a client system.

In accordance with one embodiment of the present invention, users may interact with search server 160 to annotate search result and other pages via user annotation module 164. The annotations may include positive or negative ratings (or other information reflecting a user's favorable or unfavorable opinion of the subject page or site), keywords, free-text descriptions, and/or other elements that provide descriptive and/or evaluative information about a page or site, Each user's annotations are stored in personalization database 166 and are advantageously used in responding to current and future queries submitted by that user. In some embodiments, user annotations can also be used to provide various customized search services as described below.

In embodiments of the present invention, annotations can be collected from users in a variety of ways, including annotations entered from a search results page, annotations entered using a toolbar interface, and the like. Examples of collecting annotation data are described below.

C. Alternative Annotation System Overview

Figure 2B:
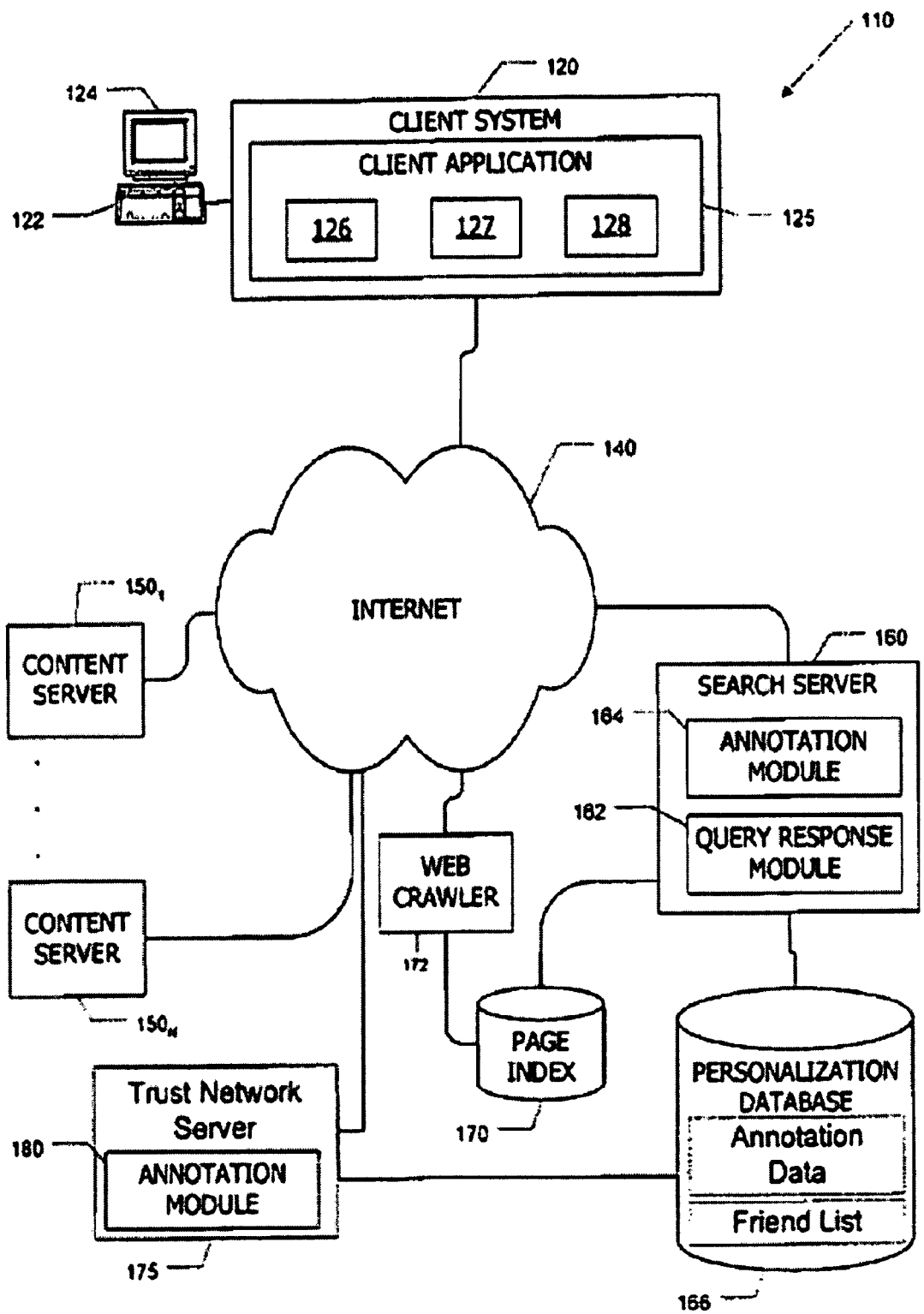
FIG. 2B is a block diagram of an information retrieval and communication network according to another embodiment of the present invention.

FIG. 2B is an illustration of another information retrieval and communication network 110 for communicating media content according to another embodiment of the invention. The same numeral scheme used for identifying elements in the communication network 110 described above with reference to FIG. 2A is used to identify the same or similar elements in the communication network 110 of FIG. 2B. Communication network 110 of FIG. 2B differs from communication network 110 of FIG. 2A in that communication network 110 of FIG. 2B includes a trust network server 175 that is configured to manage one or more friend lists 176 that are stored the personalization database 166. Communication network 110 of FIG. 2B is similar to communication network 110 of FIG. 2A in that communication network 110 of FIG. 2B includes client system 120, content server systems 150, and search server system 160 (which may include annotation module 164 and query response module 162), page index 170, and web crawler 172. These similar systems and modules are configured to operate as described above with respect to communication network 110 of FIG. 2A.

Trust network server 175, according to one embodiment, establishes a list of friends 176 for each registered user of trust network server 175 and/or search server 160, and stores the lists in personalization database 166. The list of friends may be initialized automatically by trust network server 175 and edited by the user as described below, or the friend list may be manually created. Based on the lists of friends established for various users, trust network server 175 defines, for each user, a trust network including that user's friends and, in some instances, friends of that user's friends and so on up to some limit as described below.

In some embodiments, trust network server 175 dynamically builds a trust network for each user; this includes generating a list of trust network members and associated parameters (e.g., trust weights or confidence coefficients as described below) for each member. Building of the trust network for a given user may occur in real time as trust network information is needed (e.g., when the user submits a query). Alternatively, a trust network for a given user may be built under predetermined conditions and stored for subsequent use. Examples of conditions that might trigger building (or rebuilding) of trust network information include: each time that user initiates a new session with search server 160; each time the user updates his or her list of friends as described below; or a regularly scheduled interval (e.g., daily).

According to one embodiment, the trust network server includes an annotation module 180, and/or is configured to access and use annotation module 164. Annotation module 180 may be configured to perform the foregoing described functions of annotation module 164. According to one embodiment, annotation module 164 is configured to perform the following described functions of annotation module 180, if for example, the trust network server does not include annotation module 180, but is configured to access annotation module 164, for example, via network 140 or in a peer-to-peer communication scheme. Annotation module 180, according to one embodiment, interacts with personalization database 166 to store and manage user annotation data for various users of trust network server 175. For instance, annotation data received from a user via her client system may be provided to annotation module 180 for storing in personalization database 166, and annotation module 180 may also respond to any requests for annotation data, including requests originating from query response module 162, other components of search server 160, and/or client system 120.

D. Social Network Model

In some embodiments, a trust network for a user is defined based on a social network built from trust relationships between various pairs of users. Each user can explicitly define trust relationships to one or more other users (referred to herein as "friends" of the first user). Based on various users' trust relationships, a social network connecting users to other users via trust relationships can be defined, and a portion of the social network emanating from a given user can be defined as the trust network for that user. In such embodiments, the trust network for a given user generally includes, in addition to the user herself, the user's friends and can also include friends of the user's friends, and so on. In some embodiments, all trust relationships are mutual (i.e., users A and B are friends only if both agree to trust each other); in other embodiments, one-way trust relationships can also be defined (i.e., user A can have user B as a friend regardless of whether user B has user A as a friend). Any user can define as a friend any other user whose annotations the first user believes to be of value to her.

Figure 2C:
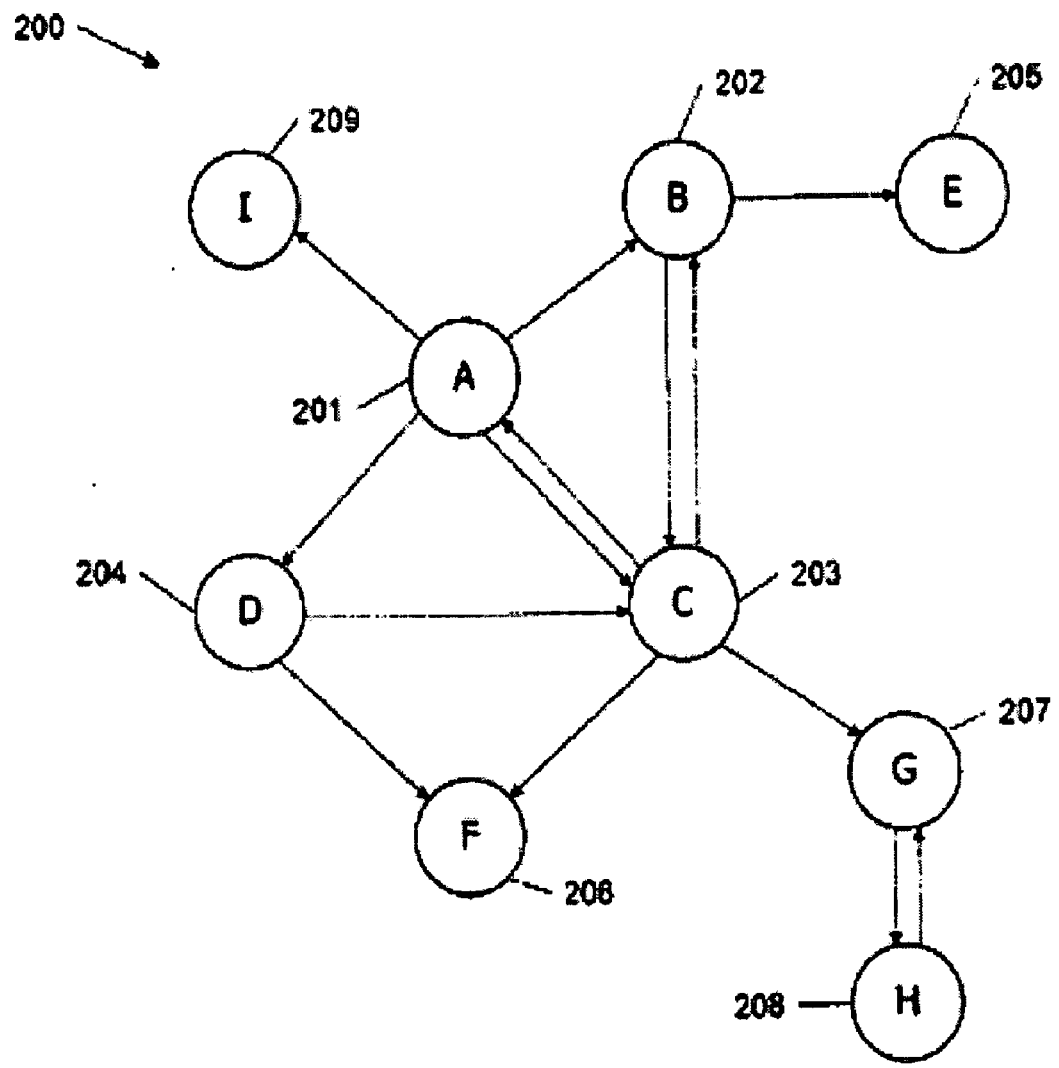
FIG. 2C is an illustration of a network graph for a trust network according to one embodiment of the present invention.

From the trust relationships defined by various users, a "social network" can be built up, and all or part of the social network can be selected as the trust network for a given user. In general, a social network can be represented by a network graph 200, e.g., as shown in FIG. 2C. The network graph 200 includes nodes 201-209, each of which represents a different user (users in this example are identified by letters A-H). The edges (arrows) connecting pairs of nodes represent trust relationships between the users; thus, user A trusts users B, C, D and I; user B trusts users C and E, and so on. In this example, the trust relationships are unidirectional; a bidirectional trust relationship (e.g., between users A and C) is represented using two edges. It is to be understood that network graph 200 is illustrative. A social network may include any number of users and any number of trust relationships, and one user may define trust relationships to any number of other users; trust relationships may be unidirectional or bidirectional.

In one embodiment of the present invention, user A is able to view her own annotations as well as annotations created by any of her friends. In another embodiment, user A may also be able to view annotations created by her friends' friends. For example, there is not a direct trust relationship between user A and user E. However, user A trusts user B, who in turn trusts user E. Thus, user A can be said to have an "indirect" trust relationship to user E, and annotations from both users B and E might be made visible to user A.

More generally, the present description refers to trust relationships with N degrees of separation, where N is an integer is equal to the minimum number of edges connecting the users in the social network. N=1 corresponds to a direct trust relationship (e.g., the relationship between users A and B); N>1 corresponds to an indirect trust relationship. For purposes of the present description, user A can be regarded as member of her own social network, with N=0. In some embodiments of the present invention, a user (e.g., user A) browsing the Web can view and edit her own annotations and can also view (but not edit) annotations created by other users in her social network up to some maximum degree of separation (e.g., N=1, 2, 3 or more).

In some embodiments, user A may assign different "trust weights" to each of her trust relationships. Trust weights may be defined on various scales, e.g., an integer from 1 to 10 or the like. Trust weights advantageously reflect the relative amount of confidence user A has in the annotations of each of her friends; in general, a higher trust weight reflects a higher degree of confidence.

Where trust weights are defined, this information can also be used in defining the trust network. For instance, a trust propagation algorithm can be used to assign a "confidence coefficient" p to users in the social network; the confidence coefficient $p_{XA}$ for a user X relative to user A is generally based on the trust weight user A has assigned to her friends, the trust weights that user A's friends have assigned to their friends and so on. Examples of trust propagation algorithms are known in the art and may be used to generate confidence coefficients. Confidence coefficients for other users relative to user A can also be determined based on degree of separation, e.g., by assuming an equal trust weight for each of user A's friends, then using a trust propagation algorithm to determine the confidence coefficients for each trust network member, or by assigning an equal confidence coefficient to each user at a given degree of separation from user A. In one embodiment, membership in user A's trust network is limited to users X whose confidence coefficient $p_{XA}$ exceeds some threshold, regardless of their degree of separation from user A. Other uses of trust weights and confidence coefficients are described below. For a further understanding of building and using trust network see U.S. patent application Ser. No. 11/082,202, filed Mar. 15, 2005, and titled "Search System and Methods With Integration of User Annotations From a Trust," the disclosure of which is incorporated by reference for all purposes.

Various interfaces are provided for user entry of annotation data for annotating user who may or may not be members in a trust network or the like, and such interfaces are described in detail below. When the user elects to annotate another user, such a friend, in the user's trust network, annotation module 180 receives the new annotation data from the user (e.g., via client system 120) and updates personalization database 166.

II. User Annotation Data Formats

User annotations may be collected in a variety of formats and may provide various information about a page, site, or user. Annotation of pages and sites is described first below and annotation of users is described second below. While an example format is described herein, it is to be understood that user annotations are not limited to the particular content or format of this example and that an annotation may include any combination of user-provided and/or automatically generated metadata related to a page or site.

As used herein, a "page" refers to a unit of content that is identifiable by a unique locator (e.g., a URL) and displayable by a suitably configured browser program. A "site" refers to a group of one or more pages related to common subject matter and located on the same server. In some embodiments of the invention, the user who creates an annotation can indicate whether that annotation should apply to a single page or to a group of related pages. In the latter case, the user can advantageously define the scope of the site, as described below. In some embodiments, there is no difference between a page annotation and a site annotation other than the number of pages to which the annotation applies.

A. Content of Annotations

In one embodiment, each annotation is a structured entry in a personalization database 166. FIG. 3A illustrates the content fields of an annotation 300 for a page or site. Fields in left column 302 can be automatically generated and updated by user annotation module 164; fields in right column 304 are preferably user-supplied. Entry of information into the fields is described below in detail.

The automatically generated fields include an "Author ID" field 306 that stores the user CD of the user who created the annotation and a "URL" field 308 that identifies the page or site to which the annotation pertains. "Host flag" field 310 indicates whether the annotation applies to a page or, to a site. If the host flag is set to "page," the annotation applies only to the page whose URL, exactly matches the string in field 308, whereas if the host flag is set to "site," the annotation applies to any page whose URL begins with the string shown in field 308. Thus, an annotation with host flag set to "site" could apply to any number of pages. Host flag field 310 may be automatically set to a default value (e.g., "page"), and the user can be given the option to change the value.

"Title" field 312 stores a title for the subject page (or site). This field is advantageously filled by default with a page title extracted from the subject page's source code; in some embodiments, the user is allowed to change the title. "Abstract" field 314 stores a text abstract of the subject page or site; this abstract can be automatically generated as described below, or the user can be invited to apply an abstract.

The remaining fields in column 302 provide historical information about the annotation. For instance, "referral" field 316 provides contextual information about how the user arrived at the subject page or site. In the case of an annotation entered from a search results page, referral field 316 advantageously includes the query in response to which the results page was produced, as shown in FIG. 3A. Where the user supplies an annotation for a currently displayed page via a toolbar interface, the referral field 316 might include historical information about what the user was viewing prior to navigating to and annotating the subject page. For instance, if the user navigated to the subject page by following a link from another page, referral field 316 might contain the URL of that other page. If the user navigated to the subject page by clicking on a link in another program (e.g., an e-mail client or word processor), referral field 316 might identify the program. If the user entered the URL for the subject page manually (e.g., typing it into an address bar of the browser window), referral field 316 might indicate manual entry. It should be noted that the referral field is not limited to a single entry; for instance, in some embodiments, the referral field might store a longer navigation trail (e.g., the entire browser session leading up to navigating to and annotating the subject page, including any search queries entered during that session regardless of whether the subject page was returned as a hit or visited by the user).

Where a user has annotated a page and later revised that annotation, referral field 316 is advantageously updated to identify the referral source that led to the revised annotation. "Old referral" field 318 can be used to store contextual information related to the previous annotation; this information would be similar to information stored in referral field 316. Any number of old referrals may be maintained.

"Last updated" field 320 provides a timestamp indicating when the user last updated the annotation. "Last visited" field 322 provides a timestamp indicating when the user last visited the annotated page. While FIG. 3A shows these timestamps in a YYYY-MM-DD HH:MM:SS format, it is to be understood that other formats and any desired degree of precision might be substituted. This information can be used, e.g., to identify older annotations as possibly being less reliable (especially where the annotated page has been updated more recently than the user's last visit to that page).

The fields in column 304 are supplied by the user and are advantageously left empty until and unless the user supplies data. In an embodiment, the user is not required to enter data for all of these fields, and any empty fields can be ignored when the annotation data is used in search processing as described below.

"Keywords" field 324 stores one or more user-supplied keywords or user-selected labels describing the annotated page. As used herein, "keyword" (also sometimes referred to in the art as a "tag") refers to a word or short phrase provided by the user, who is free to choose any ward or phrase, while "label" refers to a word or short phrase selected by the user from a system-defined vocabulary, such as a hierarchical list of category identifiers. In some embodiments where keywords are used, various prompts or other techniques may be incorporated into the system to encourage the user to adopt "normalized" keywords (e.g., standard spellings, standard choices among synonyms such as "bicycling" vs. "cycling" vs. "biking," or the like). Keyword normalization is particularly helpful where aggregate keywords for a page are derived from annotations by different users as described below. In some embodiments, the user may be limited to some maximum number (e.g., 10, 20, or another number) of keywords or labels.

"Description" field 326 stores a user-supplied free text description of the page or site. In populating this field, the user is not limited to words or short phrases or to any particular length. In some embodiments, description field 326 allows the user to compose and store a fairly lengthy discussion of the content (e.g., up to 500 or 1000 words), and the user may also be allowed to include links to other content as part of the description. Links could be included, e.g., to identify other sites that provide more detail about topics mentioned by the annotated page.

"Rating" field 328 stores a numerical value or other indicator reflecting the user's opinion or judgment of the page. Ratings may be provided using various scales, and the scale preferably allows at least "favorable," "unfavorable" and "neutral" ratings. For example, in one embodiment the user is prompted during creation of an annotation to give a favorable (e.g., thumbs-up) or unfavorable (e.g., thumbs-down) rating to the annotated page. The favorable and unfavorable ratings are each assigned a numerical value (e.g., +2 and −2 respectively); unrated pages are given a default (neutral) rating of zero. Other rating systems, e.g., zero to four stars, a 1 to 10 rating, or the like, may also be used. The rating indicator stored in field 328 need not match the rating scale used by the user (e.g., if the user rates a site on a scale of 1 to 10, this could be translated to a rating indicator in the range from −4 to 5). Any sites the user annotates but does not rate are advantageously treated as having a neutral rating.

It is to be understood that annotation entry 300 is illustrative and that other annotation formats with different fields may also be used. For instance, in some embodiments, the annotation may include a representation of part or all of the content of the subject page in a compressed or uncompressed form. In other embodiments, the user can connect a description to a specific portion of the content of the subject page, and the portion to which the description is connected may be stored in the annotation. In another embodiment, search server 160 may also categorize pages or sites according to some taxonomy, and such category data may be saved as part of the annotation. In still other embodiment, an annotation may include fewer fields or different fields Other metadata related to the annotated page (or site) may also be collected in the annotation record and automatically updated as the user continues to browse. For example, a counter might be provided to count the number of times the user visits an annotated page or site. The counter and/or the last-visited timestamp can be automatically updated each time the user visits the page or site. In some embodiments, only visits that occur while the user is logged in to search server 160 result in automatic updating.

Annotations in some embodiments may also include metadata that is not user-specific. For example, metadata might also include a real-world location (e.g., latitude and longitude coordinates, street address or the like) or phone number related to the subject page or site, a UPC (universal product code) or ISBN (international standard book number) or ISSN (international standard serial number) related to the subject page or site, and/or other similar information. In addition, metadata relating to various attributes or behaviors of the subject page or site, such as whether it includes adult content, what human language(s) it uses (e.g., English, Japanese, Spanish, etc.), or whether it includes pop-up windows or the like, could also be incorporated into an annotation independently of user input.

Annotation entries may be formatted in any format suitable for storing in personalization database 166 (e.g., relational database schema, XML records or the like) and can be accessed by reference to various fields. In one embodiment, the annotation record is accessible by at least author ID, URL, title, and keywords.

FIG. 3B illustrates the content fields of an annotation 350 for a user (say user A) who has annotated another user (say user B). Fields in left column 352 can be automatically generated and updated by annotation module 180; fields in right column 354 may be user-supplied. Fields that may be automatically generated and updated by the annotation module may include an author ID 356, an annotated user ID 358, a trust network ID 360, the date and time the annotations was last updated 362, and the date and time the annotations was last visited 364. Fields that may be user-supplied may include a keywords field 366 that includes a set of keywords (or tags) used to annotate user B, a description field 368, and/or a ratings field 370, which may include trust weights (described above in detail). Other fields that may be included in annotation 350, and that be user supplied include a sharing field 372 and a blocking field 374. Entry and user of information in the foregoing listed fields is described below in detail.

According to one embodiment, author ID 356 includes the name or other identifier of the user (e.g., user A) who created the user annotation. The annotated user (e.g., user B) ID includes the name or other identifier of an annotated user that is being annotated by user A. User B may or may not be a member of user A's trust network (described above). Annotation 350 may further include annotated user information 358 that might include personal and/or contact information for user B, such as user B's e-mail address, mailing address, telephone number, etc.

According to one embodiment, if user B is member of user A's trust network, the trust network ID may include the name of the trust network. This identifier might be the name of a discussion group, an e-mail group or the like. If user B is not associated with one of the user's trust network, the trust network ID might indicate this with a "none" entry or the like, might be left blank, or field might be eliminated from the annotation. According to one embodiment if user B is not a member of one of user A's trust network, and if user A annotates user B, a one directional or two directional trust relationship is formed between user A and user B. Trust network creation is described above.

Keywords 366 in keyword field 366 may include characters strings (e.g., text strings) that may include one or more words or the like. A keyword that includes more than one words is often referred to as a "unit." According to the example being considered, the keywords in the keyword field include: i) road cyclist, ii) work, and iii) bowling. User A might use these keywords to indicate that user B is a bicyclist who rides with user A, a coworker of user A, and is in user A's bowling league. Description field 368 may be configured to store an extended description of user B.

According to one embodiment, ratings field 370 might include an indicator (e.g., a trust weight described above) that indicates user A's opinion of user B's annotation reliability or the like. Similar to ratings field 328 described above, ratings field 370 may provide for the use of various scales, and may provide for at least "favorable," "unfavorable" and "neutral" ratings, which may be indicated by numerical values or the like.

According to another embodiment, sharing field 372 and/or blocking field 374 include keywords entered by user A, for example, via her client system 120. Keywords in the sharing field and the blocking field may have been used by user A to annotate content, such as pages, sites, and/or other users (e.g., user B). It is noted that keywords used to annotate content and users may or may not include the same text strings. If a keyword is entered in the sharing field, and the keyword has been used to annotate a piece of content, then the annotation associated with this keyword, this keyword, and/or the piece of content annotated by the keyword may be made available to user B. For example, if user B requests the search server to conduct a search, and hits in the search results have been annotated by user A with a keyword in the sharing field, than user B may be permitted to view user A's annotations for the hits. The keywords in the sharing field may also be used by the search server to rank the hits in the search results (described in detail below) served to user B via user B's client system.

Figure 4A:
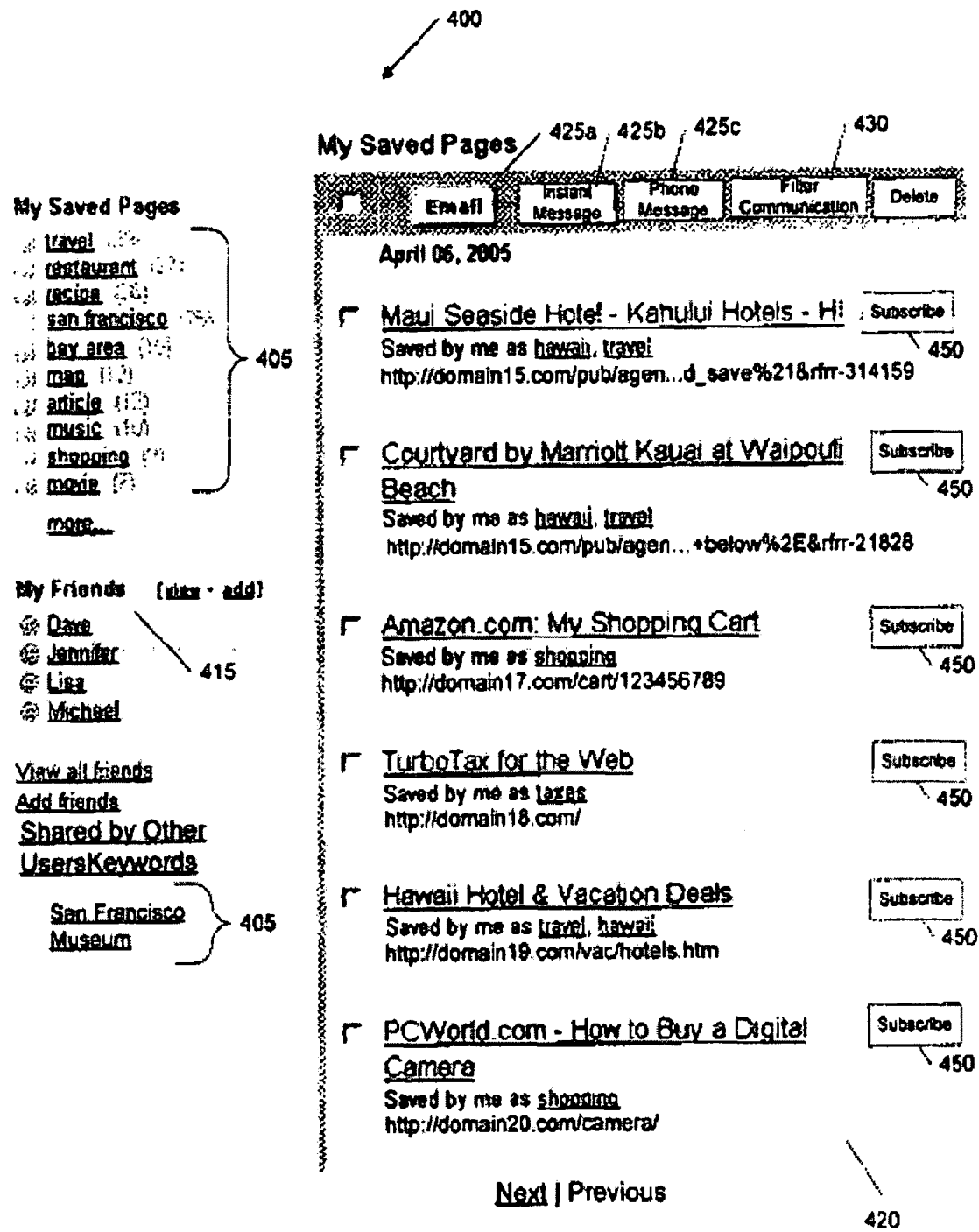
FIG. 4A is an illustration of an annotation navigation page according to one embodiment of the present invention.

Annotated content annotated by user A may also be made available to user B via an annotation navigation page 400 that is shown in FIG. 4A. While annotation navigation page 400 is described below as a page accessible to user B, each user of system 110 may be associated with an annotation page by which the user can navigate content via the user's keywords, shared keywords shared by other users via sharing filed 372 or the like. Annotation navigation page 400 might be published on the display of user B's client system at the request of user B via interaction with user interface module 126 (e.g., a browser program). The trust network server, the search server, or other server may be configured to retrieve annotation 350 and/or user B's own annotations from the personalization database 166 and transfers these annotations to the client system for publishing on page 400.

According to one embodiment, annotation navigation page 400 includes a list of keywords 405 that has been used by user B to annotate content and/or others users. The annotation navigation page may include another list of keywords 410 that have been shared with user B by other users (e.g., user A), for example, via sharing field 372 of annotation 350. For example, if user A has entered the keyword "mountain biking" and "San Francisco" in sharing field 372 for the annotation user B, then these keywords may be included in keyword list 410. The annotation navigation page may further include a list of friends 415, wherein the friends may be included in one or more of user B's trust networks, or may include the names of users who user B has annotated. User B may select a keyword from one of the lists of keywords to view abstracts for the content annotated by the selected keyword. For example, if user B selects (e.g., clicks on) the keyword San Francisco (shared by user A via the sharing field) from keyword list 410 or keyword list 415, then a list of abstracts 420 for the annotated content, which is annotated by this keyword, is displayed on the annotation navigation page (FIG. 4B).

According to another embodiment, blocking field 374 of annotation 350 may include one or more keywords entered by user A. Content that has been annotated with a keyword in the blocking field is rendered unavailable to user B via use of this keyword. Moreover, the keyword and the annotations associated therewith may not be available to user B. For example, if user B requests a search via this user's client system and the search server, and the hits in the search result are annotated with keywords in the blocking field, then user B will not be permitted to view user A's annotations for these hits. Also, if user B is in a trust network with user A, and would generally be permitted to view user A's annotations, for example, via the annotation navigation page, then user B will not be permitted to retrieve (via her client system) the annotated content via these keywords. One or both of the trust network server and the search server may be configured to block content and annotations as described above based on keywords in the blocking field.

According to another embodiment, user A may select one or more keywords that this user has used to annotate a plurality of other users to initiate the transmission of a communication that is selectively transmitted to the other users annotated by the select keyword. A variety of programs and program interfaces may be operative on the client system and/or one or more of the described servers that permit user A to selectively communicate with these other users based on a selected keyword. For example, the annotation navigation page may include one or more communication buttons 425 or the like that are configured to launch a communication program (e.g., an e-mail program, a text messaging program; such as an instant messaging (IM) program, etc.), or the like. The communication program may be executed by client system 120 and a communication server (not shown), such as an e-mail server, an IM server or the like. Those of skill in the art are familiar with such communication programs and communication servers and will not be described in detail herein. One or more of communication buttons 425 may be used in conjunction with one or more selected keywords in keyword list 405, for example, that may be selected by user A to designate annotated users who are to receive the communication. For example, user A may select the keyword "museum" and the e-mail button 425a to send an e-mail communication to all users that have been annotated by user A with the keyword museum.

According to a further embodiment, the annotation navigation page is configured to permit user A to select another keyword from list 405, or the like, that inhibits a set of the other users in the plurality of users described above from receiving the communication. The annotation navigation page, or other user interface, may include a "filter communication" button 430 or the like that may be used in conjunction (e.g., pressed before or after the keyword is selected) with a select keyword selected by user A to inhibit the set of other users annotated by this keyword from receiving the communication. For example, if each of the other users in the plurality of the other users is annotated with the keyword "museum," and a set of these other users is also annotated with the keyword "San Francisco," then the set of other users annotated by both the keyword museum and San Francisco will not receive the communication, whereas the other users annotated only by the keyword museum will receive the communication.

The communication program may be configured to receive information for the other users that are to receive the communication, and transfer the communication to these other users via the communication server. Alternatively, the trust network server, the search server, or other sever may be configured to receive the information for the others users that are to receive the communication, and transfer this information to the communication sever via the network. It should be understood that a variety of user interfaces and servers may be configured to effect the foregoing described communication and that the foregoing described embodiments are exemplary.

According to another embodiment, user B is permitted to subscribe to content shared with user B by user A via shared keywords in the shared keyword fields. For example, is user A has annotated content that includes a syndication feed, such as an RSS (rich site summary) feed, then via one or more programs and program interfaces, user B may select a piece of annotated content annotated by user A to subscribe to the annotated content. For example, one or more screen buttons 450 (e.g., an add syndication feed button, an add RSS feed button, an add BLOG button, etc) may be presented on the annotation navigation page, for example, adjacent to a shared, annotated piece of content. Selection of one or more of these buttons will subscribe a select user page (e.g., a home page, such as a My Yahoo! page) to the content. Subscription to syndicated content is described in detail in U.S. patent application Ser. No. 11/082,128, filed Mar. 15, 2005, titled "Integration of Personalized Portals with Web Content Syndication" by Ali Diab et al., which is assigned to the assignee of the instant invention, and is incorporated by reference herein in its entirety for all purposes.

B. Organization of Annotations

In some embodiments, users can organize their annotations using folders. For example, each user may have a "Main" folder, into which that user's new annotations are placed by default. The user may create additional folders as desired. In some embodiments, the user may also define subfolders within folders. User interfaces for creating and managing folders may be of generally conventional design.

Figure 4C:
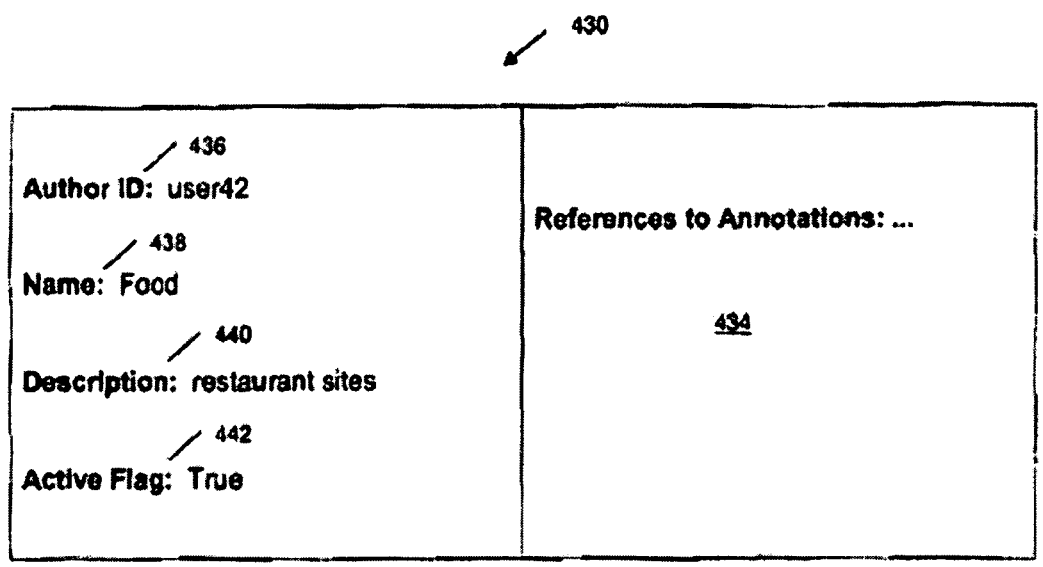
FIG. 4C is a schematic representation of a folder record for organizing annotations according to an embodiment of the present invention.

In one embodiment, each folder is defined using a folder entry in personalization database 166. FIG. 4C illustrates a folder entry 430 according to an embodiment of the present invention. Folder entry 430 includes a references field 434 that provides references (e.g., persistent pointers) to the annotations and/or subfolders belonging to folder 430; a linked list or other suitable data structure may be used to implement references 434.

Folder entry 430 also advantageously includes other fields usable for folder management. In one embodiment, those fields include an "Author ID" field 436 that stores the user ID of the user to whom the folder belongs and a "Name" field 438 that stores a user-supplied folder name (e.g., with an upper limit of 80 characters). "Name" field 438 may default to "New Folder" or some other suitable string. "Description" field 440 stores a user-editable free text description of the folder's purpose or content; this field may default to an empty state. According to a specific embodiment, the folder includes an "Active" field 442 that stores a flag (e.g., a Boolean value) indicating whether the annotations in that folder should be used in responding to queries.

It will be appreciated that folder formats may vary and that other fields may be included. With the exception of the "Main" folder, the user may freely create, rename, and delete folders. In some embodiments, multiple folders can store a reference to the same annotation; in other embodiments, each annotation is assigned to exactly one folder at a time, and users can move annotations from one folder to another or create a copy of an annotation in a different folder. In some embodiments, each annotation entry may also include a "folder ID" field that stores a reference back to the folder(s) to which the annotation is assigned.

While folders are included in specific embodiment of the present invention, providing folders allows an additional degree of user control over the annotation and search experience. For example, a user can arrange her annotations in multiple folders, with the "active" flag set to true for one or more of the folders and to false for others. When the user enters a query, only annotations in the active folder(s) would affect the results. The user may also use folders to collect and organize annotated pages in a manner somewhat similar to "bookmarks" or other personal site lists supported by various Web browser programs or Internet portal services. In an embodiment, the folders and annotation data described herein are maintained for the user by search server 160 and can be made available to the user regardless of the location from which she accesses search server 160.

In another embodiment, folders are not used, and use of annotations is instead managed based on the user-supplied keywords or labels in the annotation records. For example, the active flag and/or publication flag may be defined per keyword rather than per folder.

C. Interface Page to Annotations

As users find and annotate various pages, sites and/or other users, each user will build up a personal "library" of Web content that is useful to that user. In some embodiments, annotation module 164 and/or annotation module 180 (FIGS. 2A and 2B) provides an interface that allows a user to manage her library of annotations and to interact with her annotation data in a variety of ways. For example, annotation module 164 and/or annotation module 180 may be configured to generate and provide to each user a customized "My Library" page. A user who is logged in to search server 160 or trust network server 175 can request this page, e.g., by following a link from a search interface or search results page, by following a link from a personalized or generic portal page or site hosted by search server 160, by activation of a button on the annotation navigation page, or by activating a button on a browser toolbar or other persistent interface. In some embodiments, a user who is not logged in can request her "My Library" page, and then be prompted to log in before the page is displayed.

Figure 5:
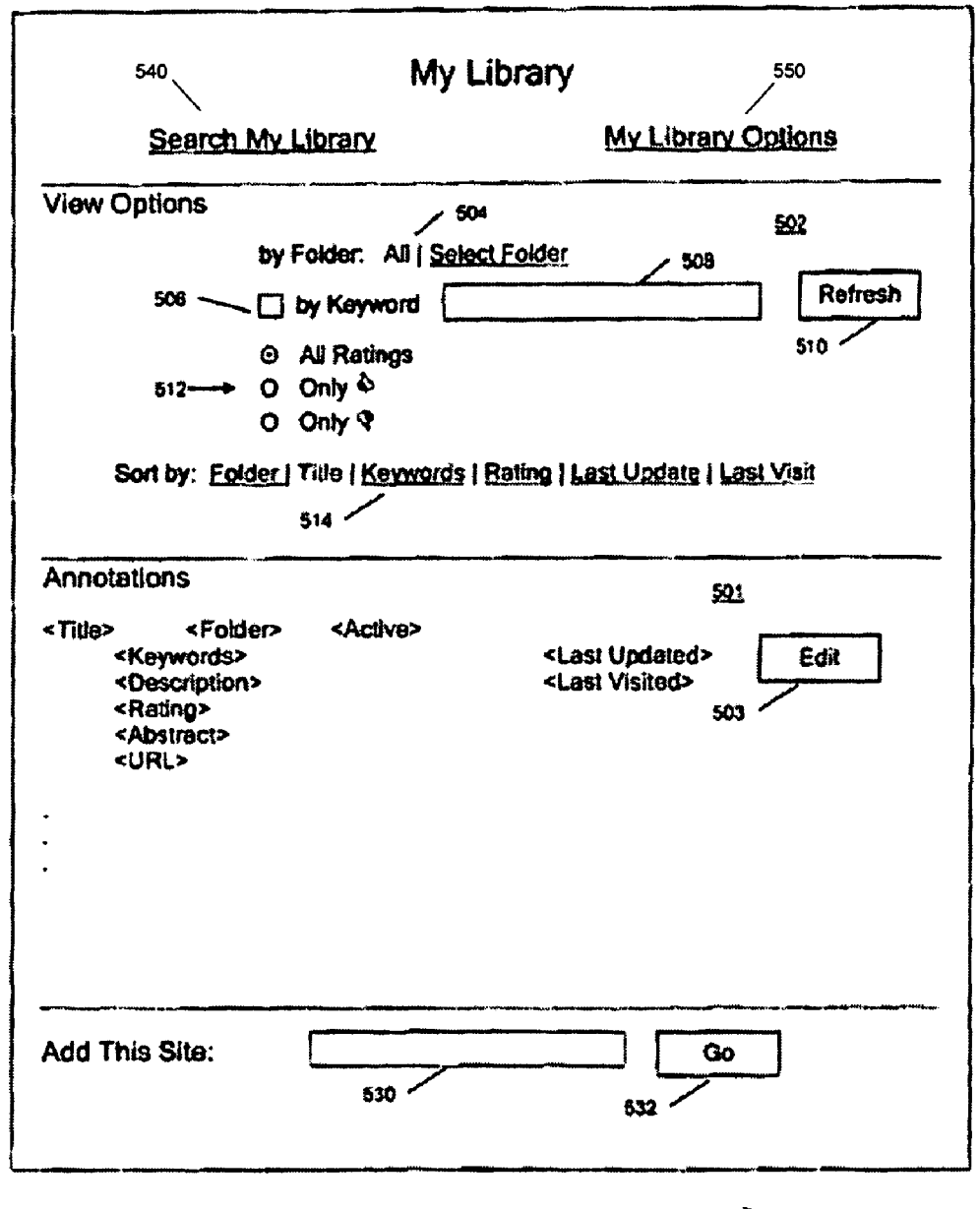
FIG. 5 is an example of a user interface page for viewing and organizing annotations according to an embodiment of the present invention.

FIG. 5 is an example of one implementation of a library interface page 500 for a user according to an embodiment of the present invention. Page 500 includes a section 501 that displays annotations from the user's library. Various fields from each annotation (e.g., the fields shown in FIG. 3A and/or FIG. 3B) can be displayed, and a link to each annotated page or site is advantageously provided. An "Edit" button 503 allows the user to edit an annotation. The editing interface can be generally similar to the creation interface, which is described below, and may also allow the user to move or copy annotations from one folder to another.

Section 502 provides interface controls for selecting and arranging annotations to be displayed in section 501. For instance, button group 504 allows a user to select one or more folders to be viewed. The default selection is "all," and activating the "Select Folders" option in group 504 takes the user to a folder selection interface (not shown), which may be of generally conventional design and may allow the user to select one folder, a group of folders, or a folder and its subfolders. When the user finishes selecting folders to view and returns to page 500, the page is updated to reflect the current folder selection.

A checkbox 506 allows the user to request a display of only those annotations that include one or more user-specified keywords. After checking box 506 and entering one or more desired keywords in a text box 508, the user activates "Refresh" button 510 to refresh the listing. In response to activation of button 510, search server 160 searches the keyword field of the user's annotations for the keyword(s) from text box 508 and updates the listing in section 501 to include only the annotations having matching keywords.

Radio buttons 512 allow the user to specify whether all annotations, or only annotations with favorable (or unfavorable) ratings, should be displayed. Radio buttons 512 advantageously default to selecting all annotations, and the user can change this setting at will.

Button group 514 allows the user to specify how the list of annotations in section 501 should be arranged, e.g., by folder, by title, by rating, by keywords, or by the timestamp of the last update of the annotation or last visit to the annotated page or site.

It should be noted that the various controls in section 502 could be used together. For instance, the user can specify that only annotations in a particular folder that include a particular keyword should be displayed, or that only annotations with positive ratings in a particular folder (or group of folders) should be displayed, and so on.

In other embodiments, other arrangements of annotations can be viewed. For example, a list of some number (e.g., 5, 10, 20, 50) of most frequently visited annotated pages, most recently visited annotated pages, or most recently annotated pages might be viewable. In other embodiments, the user can also view contextual information about the annotation (e.g., the contents of Referral field 316 and/or Old Referral field 318 shown in FIG. 3A).

In various embodiments, page 500 can support other user interactions with annotations. For example, using text box 530, the user can provide the URL of a new page or site to be annotated, or provide a user identifier (e.g., name, e-mail address, etc.) for an annotated user, identifier for a friend list and select user therefrom. The user can then activate "Go" button 532 to create the annotation. In some embodiments, if the URL or user identifier entered in text box 530 matches a URL or an annotated user of an existing annotation, the user is shown the existing annotation and invited to update it.

"Search My Web" button 540 initiates a search operation using the user's library (or a portion thereof) as the search corpus. This operation is described below.

It will be appreciated that the library interface page described herein is illustrative and that variations and modifications are possible. Any interface that allows the user to view, organize, and search her annotations may be used, and the interface may have more features, fewer features, or different features from the particular combination shown.

III. Collection of Annotation Data

A. Annotation Pages

Figure 6A:
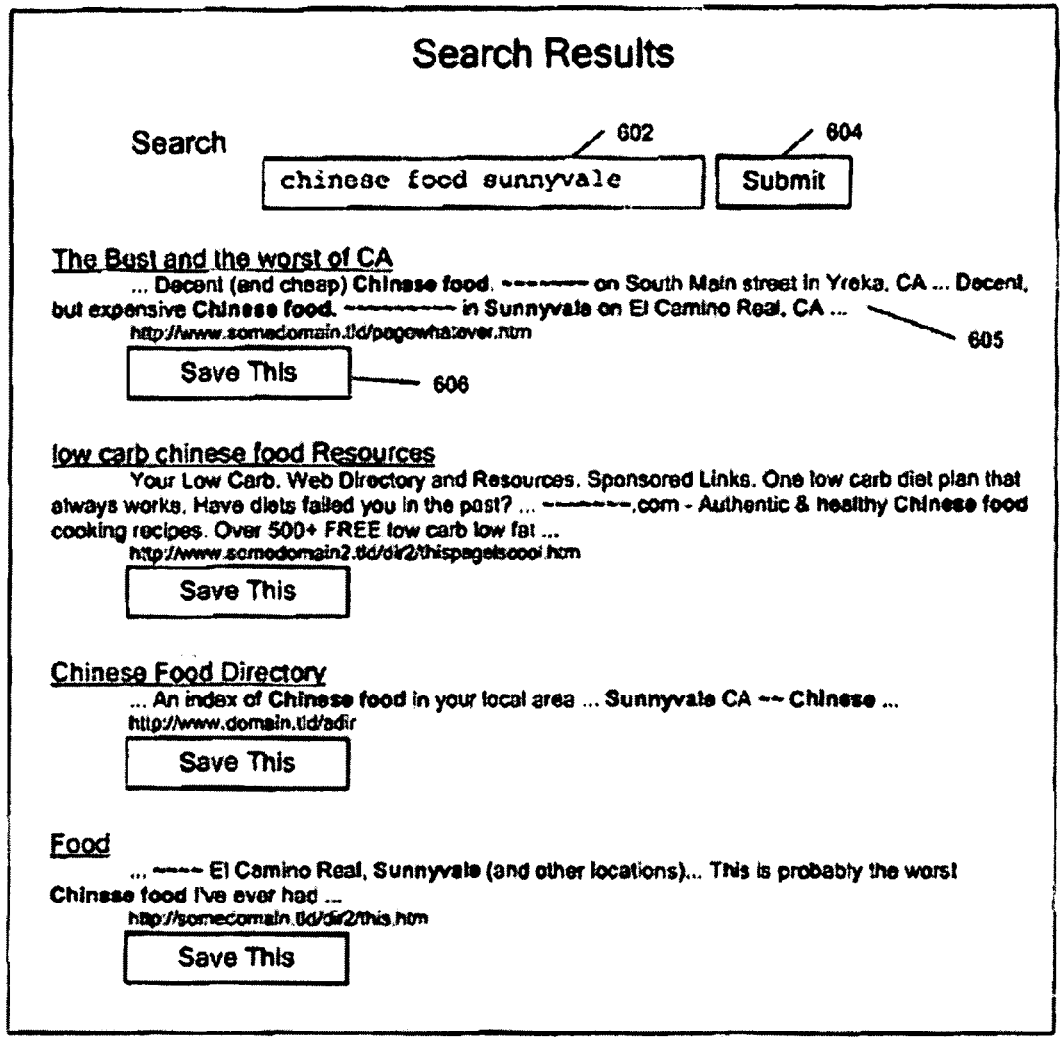
FIG. 6A is an example of a search result page according to an embodiment of the present invention.

In various embodiments, various interfaces are provided by which the user can indicate a desire to annotate a particular page, site, and/or user and thereby initiate creation of an annotation. FIG. 6A is an example of a search results page 600 (also referred to herein as a search report) that provides an interface for annotating hit pages or sites. Search results page 600 is generated in response to a user query as shown in text box 602; "submit" button 604 is used to submit queries. Each result 605 includes various information, such as the title, an automatically generated abstract, a URL, and the like. Next to (or below) each result is a "Save This" button 606 that launches a page or dialog box via which the user can annotate that particular hit. An example of a suitable page is described below.

Figure 6B:
FIG. 6B is an example of a trust network interface page according to one embodiment of the present invention.

FIG. 6B is an example of a trust network interface page 650 according to one embodiment of the present invention. Page 650 provides various mechanisms for a user (e.g., user A) to view and modify a list of her friends for purposes of defining a trust network using a social-network model. The current list of user A's friends is displayed in section 652. For each friend, a list entry 654 includes the user ID, a description, and a trust weight. The description field can be populated by user A with any information desired, such as the friend's real name, relationship to user A, etc. Section 652 may be implemented to support sorting by any of its fields and may include other information about each friend, such as the number of friends each friend has or a timestamp (not shown) indicating when the friend was added to the list. Information for populating list 652 can be stored, e.g., in appropriate records in personalization database 166, and retrieved by trust network module 165 in response to a user request.

Other information might also be provided. For example, in some embodiments, each entry 654 in section 652 includes an "Active" flag 655 that indicates whether the friend is to be included (smiley icon) or disregarded ("not" icon) in user A's trust network. This allows user A to disregard a friend's annotations without removing the friend from the list. For example, the same list of friends for user A might also be used in another social networking context, and user A might want another user (e.g., user D) to be on her friend list in the other context but not for purposes of viewing annotations. In some embodiments, user A may also be able to choose whether to include (use) or ignore (don't use) annotations from each friend's friends, and the entry 654 may show this information.

Each entry is accompanied by an "Edit" button 656 and a "Delete" button 658. Activating button 656 opens a dialog box (or form page), which is described in detail below, via which user A can annotate the selected friend using keywords, a detailed description, and/or update any of the information about the friend, then save or cancel the changes. Activating button 658 removes the friend from user A's list.

A "View Network" button 659 is also provided. Activating button 659 launches an interactive display of user A's trust network, including her friends and also friends of her friends out to a maximum degree of separation, minimum confidence coefficient, or other limiting parameter for defining the trust network. The display advantageously includes all users who would be in user A's trust network (i.e., all users whose annotations would be made visible to user A) and may also show users (e.g., user D) whom user A has blocked from her trust network.

In one embodiment, the display includes a network graph similar to that shown in FIG. 2C, and the graph or other display may be editable. For example, user A may be allowed to delete a node, thereby indicating that the user represented by that node should be excluded from her trust network. In one embodiment, the case where the node represents a friend of user A (e.g., if user A as the editing user were to delete node 204), deleting the node removes the friend (e.g., user D) from user A's list of friends; in another embodiment, deleting the node simply sets the "Active" flag 655 for that friend to the inactive state. Where the node is a friend of a friend (any node with a degree of separation greater than 1 from user A), deleting the node has the effect of blocking that user's annotations from being visible to user A but does not change any trust relationships. Instead, a special entry identifying a particular user as "blocked" is advantageously added to the list of friends maintained for user A in personalization database 166. For instance, if user A as the editing user were to delete node 207, user G would cease to be a member of user A's trust network, but the trust relationship between user C and user G would be unaffected and user G would remain in user C's trust network. Thus, user A can tune her trust network by selectively blocking individual members whose annotations user A finds unhelpful. In some embodiments, blocking a member also has the effect of blocking other members who are connected to the trust network only via the blocked member.

Referring again to FIG. 6B, page 650 also includes a section 660 via which user A can add a new friend. User A enters the new friend's user ID in a text box 662, one or more keywords in a text box 663, a further detailed description in a text box 664 and a trust weight in a box 666. In some embodiments, the trust weight may have a default value (e.g., 3 on a scale of 1 to 5). User A may also elect, via a check box 668, whether to include the new friend's friends in her trust network. Activating an "Add" button 670 completes the operation, and the listing in section 652 is advantageously refreshed to include the new friend. Page 650 may also include a text box 672 in which one or more sharing keyword may be entered (described above in detail), and may include a text box 674 in which blocking keywords may be entered (also described above in detail).

According to a specific embodiment, a set of users may be suggested to user A, wherein user A is permitted to select one or more of the suggested user for adding to one or more of user's A trust networks and/or for annotating. The set of suggested users may include users who annotate the same or similar content as user A, and/or annotate the same users as user A. The set of suggested users may also include users who use the same or similar keywords as user A to annotate content and/or other users. The trust network server may be configured to periodically (e.g., at the time user A adds a new user to her trust network, weekly, daily, etc.) review annotations in the personalization database to identify similar annotations (e.g., keywords) that user A and other users have used to annotate content and/or users. These other users may then be suggested to user A for selectively adding to one or more of user A's trust networks and/or for annotating. The trust network server may also be configured to periodically review the annotated content and/or annotated users that have been annotated by other users. If the annotated content and/or annotated user have been annotated by both these other users and user A, then these other users may be suggested to user A for adding to one or more of user A's trust networks and/or for annotating. The names and/or other identifiers for the suggested users may be presented to user A in a list of suggested users 676 on page 650 or the like.

It should be understood that while FIG. 6B shows a list of friends that may be in one trust network or user A, user A may be associated with and included in a number of trust networks. These various trust networks might have identifiers (e.g., group identifiers, such as Yahoo! group names) that identify the networks. Various user interfaces (e.g., pages) may be configured to permit user A to select a specific trust network that the user intends to view and/or edit. It should also be understood that a trust network might contain as few as two users that might have a one-way or two-way trust relationship.

Once defined, user A's list of friends and annotations therefore are stored in association with other user specific information for user A, e.g., in personalization database 166. This information can then be accessed and used to personalize or customize responses to that user's queries, for sharing annotations, and annotated content (e.g., via the annotation navigation page) or the like.

It will be appreciated that the interface described herein is illustrative and that variations and modifications are possible. For example, in some embodiments, a new friend can be added only if the friend consents to be added. Thus, activation of Add button 670 by user A might not immediately add any friends to user A's list. Instead, an invitation might be sent to the user named by A (e.g., user K) via e mail, instant message, or other suitable communication medium, and user K can respond with an indication as to whether he accepts the invitation. If user K accepts, a bidirectional friendship between users A and K would be established, e.g., by adding each user to the other's list of friends; if not, then no new friendship would be established.

B. Automatic Identification of Friends

In some embodiments, trust network module 165 can also automatically generate a list of friends for user A by mining various sources of information to identify other users with whom user A has voluntary contact.

For example, in one embodiment, the provider of search server 160 also provides communication services such as e-mail, IM (instant messaging), and the like. As is known in the art, such services may allow user A to maintain a list of users with whom A desires to have contact. For example, if user A is registered with the provider's IM service, user A can define a "friend" list (also sometimes called a "buddy" list), which is a list of user identifiers for other registered users with whom user A wants to exchange instant messages. The inclusion of user B (or any other user) on user A's IM friend list indicates a connection from user A to user B and suggests that user B might be a friend of user A. Similarly, if user A is registered with the provider's e-mail service, user A might maintain a personal e-mail address book that identifies users with whom user A exchanges e-mail. The inclusion of user C (or any other user registered with search server 160) in user A's address book would also indicate a connection from user A to user C and suggests that user C might be a friend of user A.

In still another embodiment, the provider of search server 160 also allows registered users to join online communities whose members can communicate with each other using bulletin boards, chat rooms, e-mail distribution lists, or the like. If two users (e.g., A and B) are both members of the same online community, it can be inferred that there is a connection between the users and a bidirectional friendship might be appropriate.

Any or all of these techniques can be used to automatically populate a list of friends for a user. In some embodiments, the user's list of friends can be pre-populated using any of the above or other sources of relationship information, and the user can then edit the list, e.g., via page 600 as described above. Where a relationship is automatically defined, page 600 advantageously indicates (e.g., in the description field) the source from which the relationship was inferred and may also indicate that the relationship was automatically defined. In embodiments where mutual consent is required to establish a friendship, any source of relationship data could be mined and used as the basis for issuing invitations to various pairs of users to become friends, with relationships being established whenever both users accept.

In other embodiments, the user's list of friends is not prepopulated by default, and the user can select which, if any, sources of relationship information (e.g., an IM friend list and/or an e-mail address book and/or community membership information) should be used to automatically populate the list. Thereafter, the user can edit the list.

C. Selection of Collections of Friends

In other embodiments, trust networks are defined based on implicit trust relationships among well-defined groups or communities of users. As used herein, a "community" refers to any ongoing forum for which search server 160 can obtain a list of user IDs of the members and associate those IDs with authors of annotations. Typically (but not necessarily), a community uses at least one network-based communication medium managed by a provider of search server 160, such as a subscription-based e-mail distribution list, a members-only chat room, a bulletin board or the like. In one embodiment, the communities correspond to Yahoo! Groups, but any other online communities whose members' identities can be determined by search server 160 might be used; more generally, any organization or forum that provides a well-defined membership list can be used as a community as long as search server 160 can map the user identifiers in the membership list to user identifiers of participants in the annotation system.

In some embodiments, user A's trust network is defined as including all users who are currently members of a community to which user A belongs. In some embodiments, user A may be able, via a suitable interface (not shown in FIG. 6B), to select one or more of the communities of which she is a member to be used as her trust network. Some embodiments might allow user A to view and edit a personal list of friends derived from the list of community members for the selected community (or communities), e.g., as described above, but it is not required that user A be able to edit or even to view a list of community members. Thus, user A can select any community to which she belongs as her trust network, even without having information as to who the other members of that community are, and the membership of user A's trust network may change automatically, with or without user A's knowledge, as members join and leave the selected community.

Where the trust network for user A is defined by reference to a community, user A may be able to block annotations from individual members, effectively removing them from her trust network. For example, when an annotation by a trust network member is displayed, the display interface may include a control via which user A can instruct search server 160 to block the author's annotations in the future. In such embodiments, personalization database 166 may include, for each user, a listing of the community (or communities) to be used to define the user's trust network and a "blacklist" of users whose annotations should be blocked.

Where user A's trust network is defined by reference to a community, all community members can be treated as having the same degree of separation (e.g., N=1) from user A. In some embodiments, all members are also initially assigned an equal trust weight, and user A might or might not be able to manually adjust the trust weights of individual members via a suitable interface (e.g., similar to page 600 described above).

In other embodiments, each community member can be assigned a "reputation score" within the community, and the reputation score for a given member can be used as a confidence coefficient for that member. Reputation scores can be determined in various ways. In one embodiment, a community member's reputation score is based on his or her level of participation in the community (e.g., frequency of posting to a bulletin board or e-mail distribution list or of participation in a chat room, etc.). In another embodiment, community members may be able to explicitly rate other members' reliability, and the reputation score for each member can be based on such ratings (see, e.g., Section IV.C, below). In still another embodiment, members of the community might be able to rate (but not edit) other members' annotations, and a member's reputation score could be based on the ratings given to his or her annotations by other members of the community.

D. User Preferences for Trust Networks

In some embodiments, trust network module 165 allows each user to specify various parameters related to how her trust network should be defined and how it should be used. For example, on page 650 shown in FIG. 6B, section 674 allows the user to control settings for the trust network. For instance, using radio buttons 676, the user can indicate whether trust network membership should be determined based on degree of separation or confidence coefficient. In some embodiments, the user might also be able to specify a maximum degree of separation within some range (e.g., $N_{max}$=1, 2, or 3) or a minimum confidence coefficient (e.g., $p_{min}$=0.2, 0.4, or 0.8). Checkboxes 628, 630 and 632 allow the user to specify the situations in which information obtained from her trust network should be displayed. For example, the user can choose to whether to have search results highlighted and/or ordered based on information obtained from her trust network (boxes 628, 630), as well as whether the browser toolbar should indicate whether a displayed page has been annotated by someone in her trust network (box 632). Examples of such operations are described below.

It will be appreciated that other user preferences and combinations of preferences might be supported. For example, the user might be able to specify whether her trust network should be built from a social network model using an explicit list of friends or implicitly from a community to which she belongs.

Figure 7A:
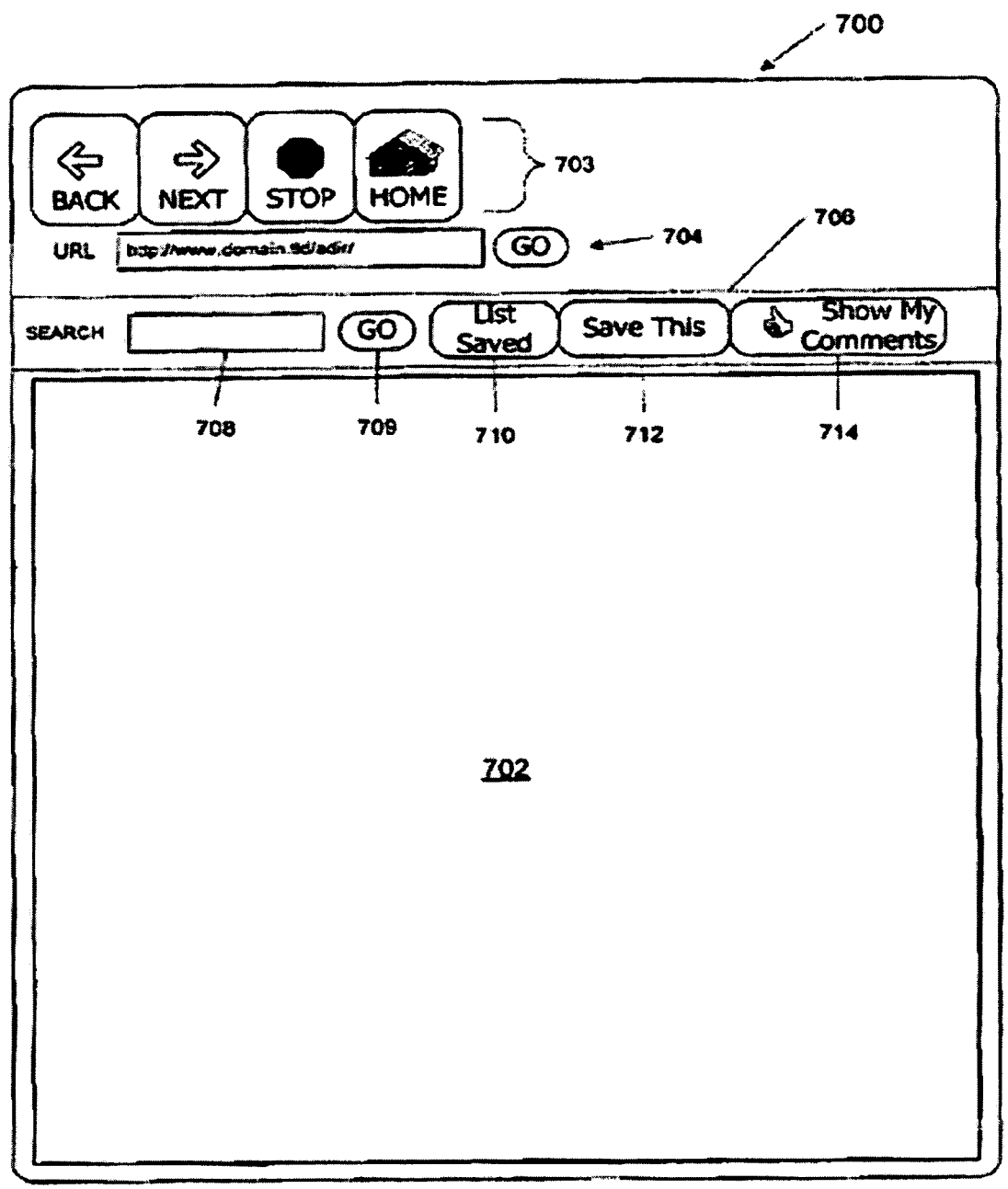
FIG. 7A is an example of a search toolbar for a Web browser according to an embodiment of the present invention.

FIG. 7A is an example of a toolbar-based interface for annotating any page the user happens to be viewing. A Web browser window 700 includes conventional elements such as a viewing area 702 for displaying Web content and default toolbars 703 providing navigation buttons (back, forward, and the like) and a text box 704 that shows the URL of the currently displayed page and also allows the user to enter a URL for a page to be displayed in viewing area 702. Browser window 700 also includes a search toolbar 706 that may be provided as an add-in to a conventional browser program or as a standard feature of a browser program.

Search toolbar 706 advantageously includes a text box 708 and "Search" button 709 via which the user can submit queries to search server 160 (FIG. 2A), a "List Saved" button 710 allowing the user to view her saved annotations and to navigate to annotated pages, and a "Save This" button 712 that opens a page or dialog box allowing the user to annotate the currently displayed page. In some embodiments, search toolbar 706 also includes a "Show My Comments" button 714 that appears in an active state whenever the user is viewing a page that she has previously annotated; the user can operate button 714 to view her previous annotation. Where the annotations include ratings, the appearance of button 714 may depend in part on the rating (e.g., the rating may be reflected by an icon included in the button). Search toolbar 706 may also include other components in addition to or instead of those shown. In addition, any other persistent interface (i.e., an interface accessible while the user is viewing any Web page) may be substituted; a search toolbar is not required.

In some embodiments, search toolbar 706 can be configured such that it is usable in a "generic" state by users who are not logged in to search server 160 and in a "personalized" state by users who are logged in. In the generic state, the toolbar provides access to basic search services (e.g., via text box 708 and "Search" button 709) and a button allowing the user to log in for access to personalized services. In the personalized state, personalization features can be supported through the toolbar. For instance, "Save This" button 712 might be provided only in the personalized state of toolbar 706; alternatively, button 712 might also be provided in the generic state, with the browser being redirected to a log-in page if button 712 is activated while the toolbar is in the generic state.

In some embodiments, the user may be offered multiple options for initiating creation of an annotation, including, e.g., the URL entry box 530 on "My Library" page 500 (FIG. 5) described above and/or the various "Save This" buttons shown in FIGS. 6A and 7A. Regardless of how creation of an annotation is initiated, the process for creating the annotation is advantageously the same.

Figure 7B:
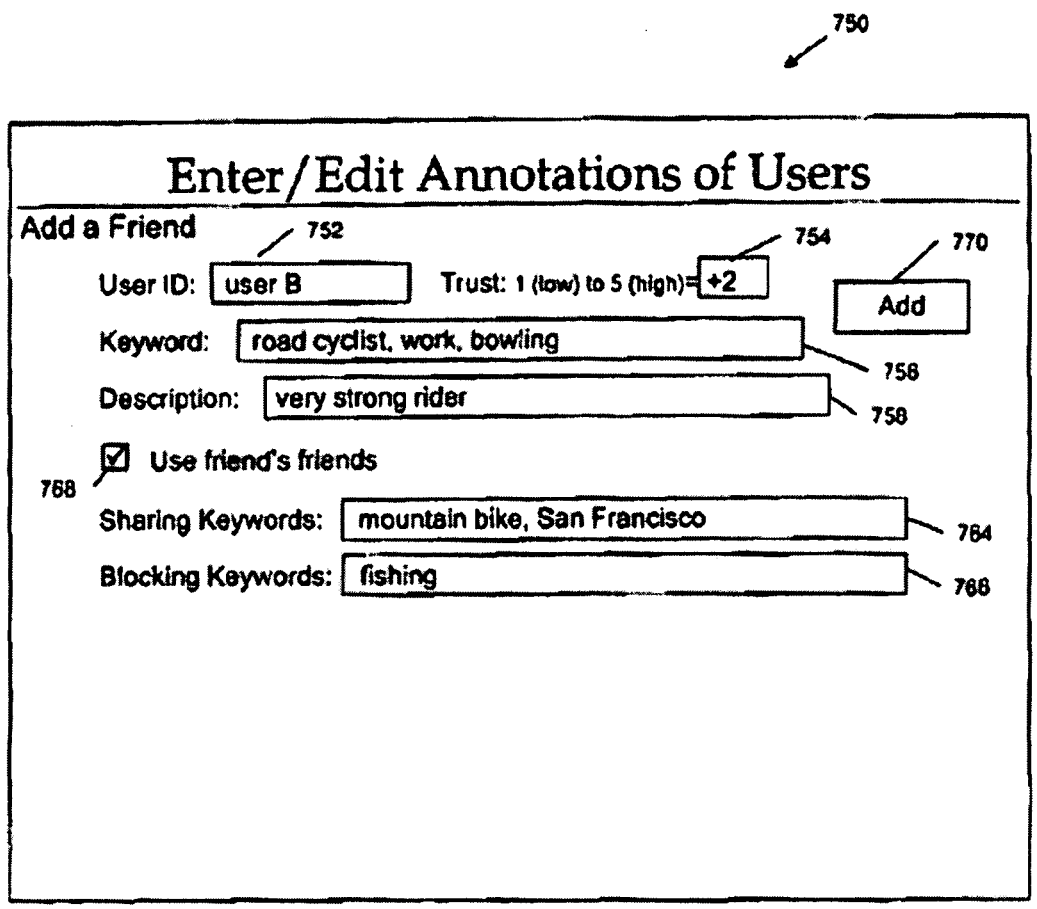
FIG. 7B is an example of a user interface for generating and/or editing an annotation of an annotated user.

FIG. 7B is an example of a user interface (e.g., a page) 750 for generating and/or editing an annotation of a user. User interface 750 maybe displayed on the display of the user system if the user selects one of the edits button 656 (FIG. 6B) (a create annotation button that might be displayed on another page, or the like) associated with a user in the displayed trust network. User interface 750 may include the same or similar fields and text boxes included in section 660 of page 650 shown in FIG. 6B. The fields and text boxes may include information for a user selected by clicking on one of the edits button 656 on page 650. For example, user interface 750 may include a user ID text box 752 that might include the user ID (e.g., user B) of a user selected by clicking on one of edits buttons 656. The user ID text box might also be configured to receive a user ID that may be entered by the user. The user interface may also include a text box 754 in which the user can enter a trust level, such as rating 328. The user interface may also include a keyword box 756 in which the user may enter and/or edit keywords used to annotate the identified user (e.g., user B). The user interface may further include a description box 758 in which the user may enter a relatively extended (e.g., five words or greater) description of the identified user. The user interface may further include a sharing keyword text box 764, and/or a blocking keyword text box 766, in which sharing keywords and blocking keywords may be respectively entered. The user interface may also include a check box 768 for indicating whether to include the identified user's friends in her trust network. Activating an "Add" button 770 completes the operation of adding and/or editing the annotation for the identified user in the personalization database 166.

Figure 8:
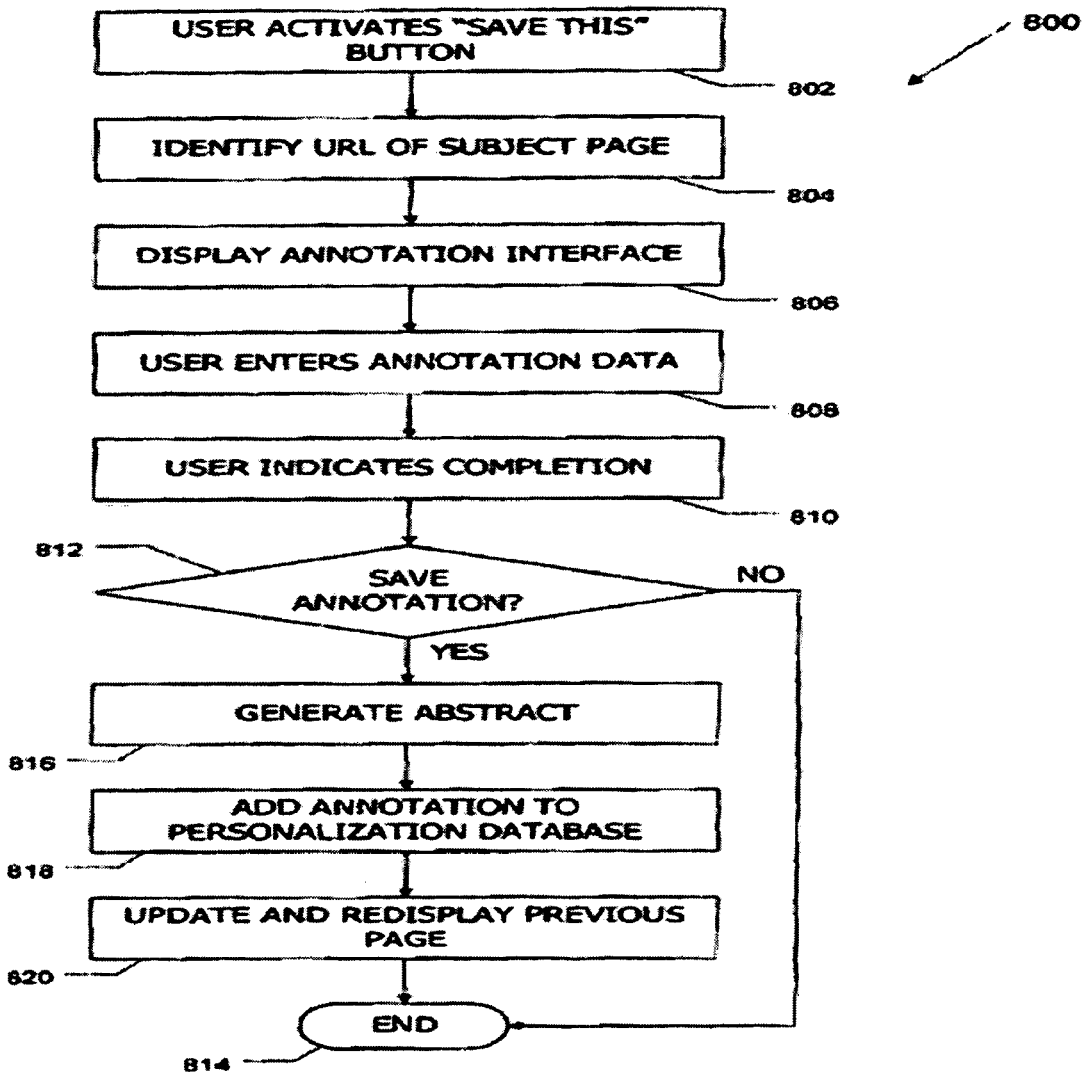
FIG. 8 is a flow diagram of a process for creating an annotation according to an embodiment of the present invention.

FIG. 8 is a flow diagram of a process 800 by which a user creates an annotation for a page (or site) according to an embodiment of the present invention. At step 802, the user activates a "Save This" button, such as button 712 on search toolbar 706 (FIG. 7A) or one of the "Save This" buttons 606 on search results page 600 (FIG. 6A). At step 804, the server identifies the URL of the page to be annotated (referred to herein as a "subject page").

At step 806, an annotation editing interface for the subject page is displayed. The editing interface is advantageously displayed in a separate window or dialog box that opens when a "Save This" button is activated. In some embodiments, the editing interface is arranged on the user's display in such a way that the user can look at both the subject page and the annotation or easily flip back and forth between the two. At step 808, the user enters annotation information into the interface.

Figure 9:
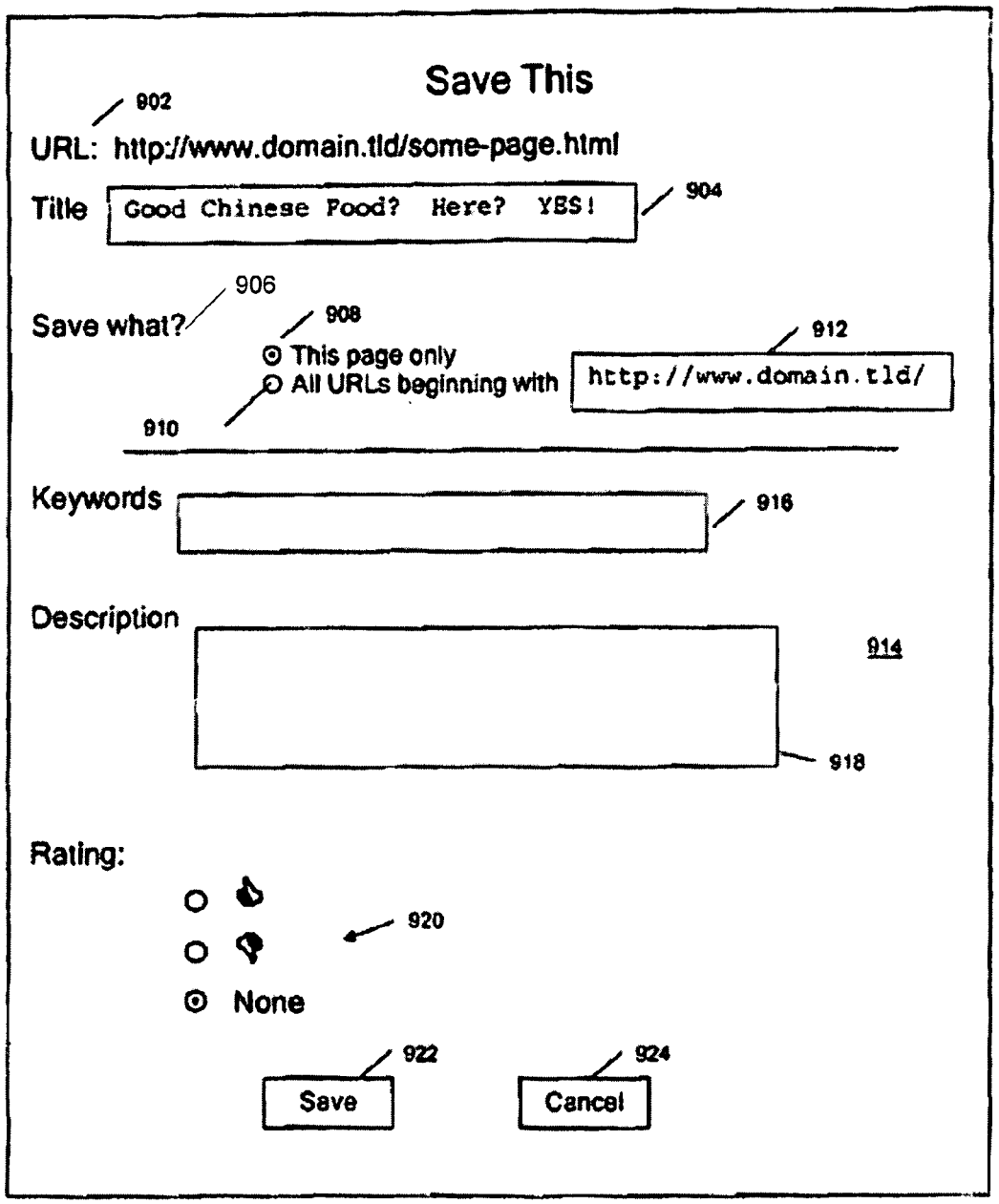
FIG. 9 is an example of a user interface page for creating an annotation according to an embodiment of the present invention.

Various editing interfaces can be used. FIG. 9 is an example of an editing interface page 900 according to an embodiment of the present invention. Page 900 may be displayed at step 802 of process 800. Page 900 displays, in area 902, the URL of the subject page. The URL, which uniquely identifies the subject page, is advantageously pre-populated when page 900 is created and may not be user-editable. The page title is displayed in text box 904; box 904 may be filled by default with a page title extracted from the source code of the subject page, and the user may be allowed to edit the title for the annotation by modifying the content of box 904.

In area 906, the user is invited to assign a scope (host flag) to the annotation using radio buttons 908, 910. In one embodiment, the host flag defaults to "page" (via radio button 908), meaning that the annotation applies only to the URL displayed in area 902. The user can change the host flag to "site" (via radio button 910) and can also adjust the scope of the site by editing the URL displayed in text box 912 to reflect the intended scope of the site. For example, a host server (identified by the portion of the URL between the double slash and the next slash) might be shared by a number of independent Web sites whose content could be completely unrelated. Where the scope is set to "site" (via radio button 910), a user might be able to specify a subset of pages on that host server to which the annotation should be applied, e.g., by modifying text box 912 to further specify a directory on the host server that encompasses the desired subset of pages.

Area 914 accepts user input. For example, the user can enter one or more keywords in text box 916. The keywords may be entered, e.g., as a comma-delimited list. In some embodiments, keywords may be limited to a maximum number (e.g., 5, 10, 20) or to a maximum number of characters per keyword (e.g., 40, 80), or to a maximum total number of characters. In another embodiment, the user may be able to select one or more labels to be applied to the page or site from a system-supplied list; conventional interface elements for selecting labels from a list can be used. Text box 918 is available for free-form text entry and advantageously accepts a fairly large number of characters (e.g., up to about 5000). The user can also rate the page or site using rating radio buttons 920. In one embodiment, the default is no rating, and the user can change the default by selecting a different one of buttons 920. In an embodiment, the user is not required to complete all of the fields in section 914.

Referring again to FIG. 8, at step 810, the user indicates that the new annotation is complete. For example, in interface 900 of FIG. 9, the user indicates completion by activating either a "Save" button 922 or "Cancel" button 924. "Save" button 922 indicates that the completed annotation should be saved, and "Cancel" button 924 indicates that the annotation should be discarded.

At step 812, it is determined whether the annotation is to be saved, e.g., whether the user activated "Save" button 922 or "Cancel" button 924. If the annotation is not to be saved, process 800 exits (step 814). If the annotation is to be saved, then at step 816, an abstract for the annotation is automatically generated. In one embodiment, the abstract is generated by using the user-supplied keywords and/or description to identify the most relevant portion(s) of the page content. This algorithm can be similar to conventional algorithms for generating abstracts for search hits based on query terms. At step 818, the new annotation is added to personalization database 166. Step 818 may include creating a database record; populating the record with information supplied via editing page 900; compressing the annotation data for efficient storage, search and retrieval; and so on.

At step 820, the page the user was viewing when she activated the "Save This" button is redisplayed. In an embodiment, the redisplayed page (or the search toolbar) is updated to reflect the existence of the new annotation. For example, in the case where the user activated a "Save This" button 606 on search result page 600 (FIG. 6A), the search result page 600 is updated based on the annotation, as described below.

Where the user activated "Save This" button 712 of search toolbar 706 (FIG. 7A), "Show My Comments" button 714 can become active to indicate that the new annotation exists.

It will be appreciated that the process for creating annotations and the editing interface described herein are illustrative and that variations and modifications are possible. Process steps described as sequential may be executed in parallel, order of steps may be varied, and steps may be modified or combined. In some embodiments, the user may be able to activate a "Save This" button or similar button before the user's identity is known to search server 160. In that event, search server 160 may prompt the user to log in before displaying the editing interface.

In one embodiment, client application 125 (FIG. 2A) includes an annotation creation module that displays page 900 or another user-editable form for supplying annotation data, and user annotation module 164 of search server 160 does not participate in process 800 until the user chooses to save the annotation. At that point, if the user is not logged in to search server 160, she may be prompted to log in so that the annotation can be associated with her user ID.

Figure 11:
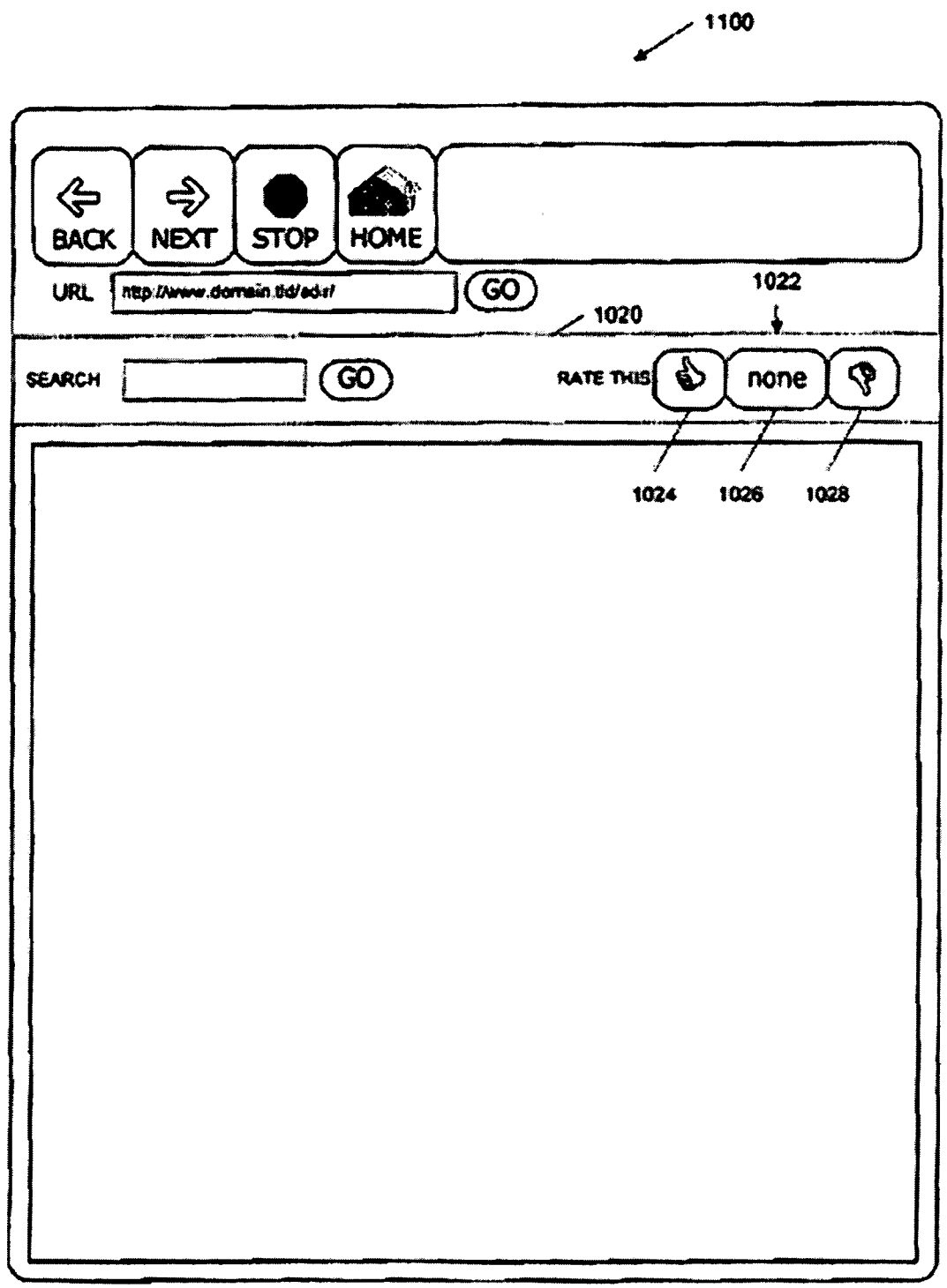
FIG. 11 is an example of a search toolbar for a Web browser according to another embodiment of the present invention.

The annotation editing interface advantageously conforms to the particular content of the annotation data structure in a given embodiment. For instance, FIG. 10 is an example of an in-line annotation editing interface 1000 that allows the user to enter a rating for a search hit. Interface 1000 is integrated in-line into a search results page 1002. The user is invited to rate each hit using one of buttons 1004, 1006, 1008. (If the user does not select a rating, the page might not permit annotation.) Similarly, FIG. 11 is an example of a browser window 1100 with a toolbar-based annotation editing interface 1020 that allows the user to enter a rating for a page being viewed. Interface 1020 is part of a search toolbar 1022, which can be generally similar to search toolbar 706 of FIG. 7A described above. Interface 1020 appears when the user is viewing an unannotated page and includes button 1024, 1026, 1028 for entering a favorable, neutral, or unfavorable rating. It is to be understood that different interfaces adapted to different rating schemes could be substituted. Different interfaces could also be combined; for instance, the user could enter a rating and then be invited to provide additional metadata.

IV. Search Using Annotation Data

Once collected, annotation data can be used in various ways to enhance the user's searching and Web browsing experience. Examples of such enhancements will now be described; it is to be understood that the use of annotations is not limited to any particular feature or set of features.

A. Enhanced Web Search

In one embodiment, search server 160 accesses a user's library of annotations to provide additional information on a search results page generated in response to a query from that user. For example, a separate list of annotated hits (i.e., hits that correspond to annotated pages in the user's library) may be included in the search results, or annotated hits may be highlighted wherever they happen to appear in the results list. Where the annotations include ratings, a separate list of favorably-rated hits might be provided, rated hits might be highlighted in a manner that reflects the querying user's ratings, or ratings data might be used as a factor in ranking the hits.

Figure 12:
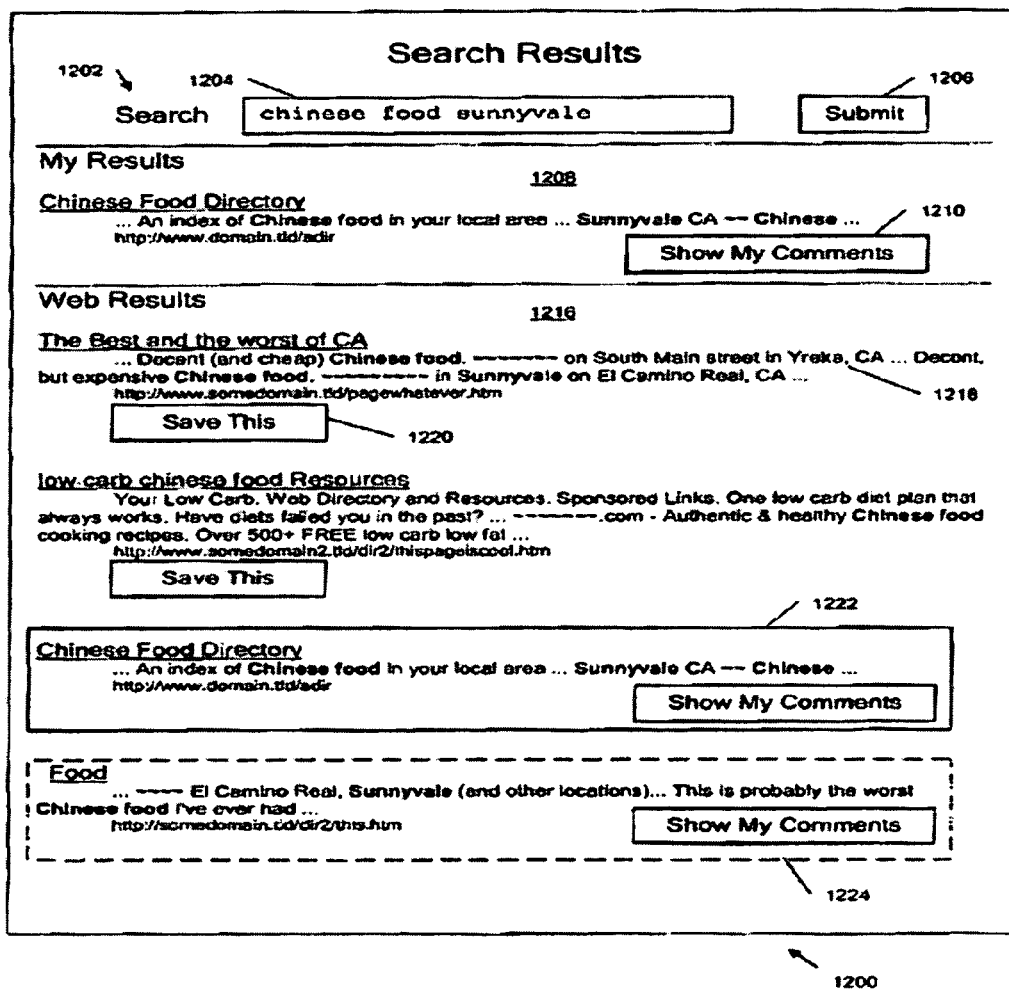
FIG. 12 is an example of another search results page according to an embodiment of the present invention.

FIG. 12 is an example of a search results page 1200 enhanced with annotation information according to an embodiment of the present invention. Results page 1200 might be generated by query response module 162 in response to a user's query. In this embodiment, results page 1200 includes a banner section 1202. In addition to page identifying information, banner section 602 includes a search box 1204, which shows the current query (e.g., "chinese food sunnyvale") in editable form together with a search button 1206 enabling the user to change the query and execute a new search. These features may be of generally conventional design.

Section 1208 is a personalized results area ("My Results"), in which any hits that the user has previously annotated are displayed. In some embodiments, section 1208 may show only results for which the user's annotation included a favorable rating; in other embodiments, all annotated pages may be listed in section 1208. Each page is advantageously accompanied by a "Show My Comments" button 1210 that the user can activate to view her previous annotation. In some embodiments, hits may be highlighted based on the ratings (if any) the user has assigned to various sites.

FIG. 13 is an example of an annotation view page 1300 that may be generated when a user activates button 1210. Annotation view page 1300 is advantageously an overlay (e.g., a pop-up window) displayed over page 1200 such that page 1200 is at least partially visible. In some embodiments, page 1300 is displayed as an overlay over the annotated page itself rather than page 1200. In other embodiments, the annotation may be displayed in-line in page 1200 or in-line with the annotated page. Where the annotation includes metadata (e.g., a description) connected to a specific portion of the page content, such metadata may be displayed overlaying or near (e.g., immediately before or immediately after) the part of the page to which it is connected.

Page 1300 includes, in section 1302, the title, description, keywords and ratings retrieved from the annotation stored in personalization database 166. "Edit" button 1304 allows the user to edit the annotation; in one embodiment, activating button 1304 opens editing interface 900 (FIG. 9), and the various text blocks and other elements of editing interface 900 may be pre-populated using the current content of the annotation. "Close" button 1306 closes page 1300.

Referring again to FIG. 12, results section 1216 displays some or all of the hits with a ranking determined by query response module 162. Conventional ranking algorithms may be used to generate this ranking. Each entry 1218 in section 1216 corresponds to one of the hits and includes the title of that page (or site) and a brief excerpt (or abstract) from the content of that page. Excerpts or abstracts may be generated using conventional techniques. The URL (uniform resource locator) of the site is also displayed. For hits that the user has not annotated, a "Save This" button 1220 may be displayed, and while viewing page 1200, the user may elect to annotate an unannotated hit by activating a button 1220. "Save This" button 1220 is advantageously the same as button 606 in FIG. 6A above.

Any hits in section 1216 that the user has annotated may be visually highlighted to indicate the existence of the annotation. Various designs for highlighting may be used, including, e.g., borders, shading, special fonts, colors or the like. In some embodiments where the annotations include ratings, the type of highlighting depends on the rating, and the rating may be displayed on page 1200. For example, hit 1222 has a favorable rating while hit 1224 has an unfavorable rating.

In one embodiment, annotations entered by a user while viewing a results page are used in real time to update the displayed results for the current query, in addition to storing the information in personalization database 166 for future use. Thus, if the user viewing page 1200 activates a "Save This" button 1220, thereby initiating process 800 (FIG. 8) described above, the redisplayed page 1200 can be modified to reflect the new annotation. For example, the newly annotated hit might be highlighted, or results might be reranked using a rating newly given to the hit.

Figure 14:
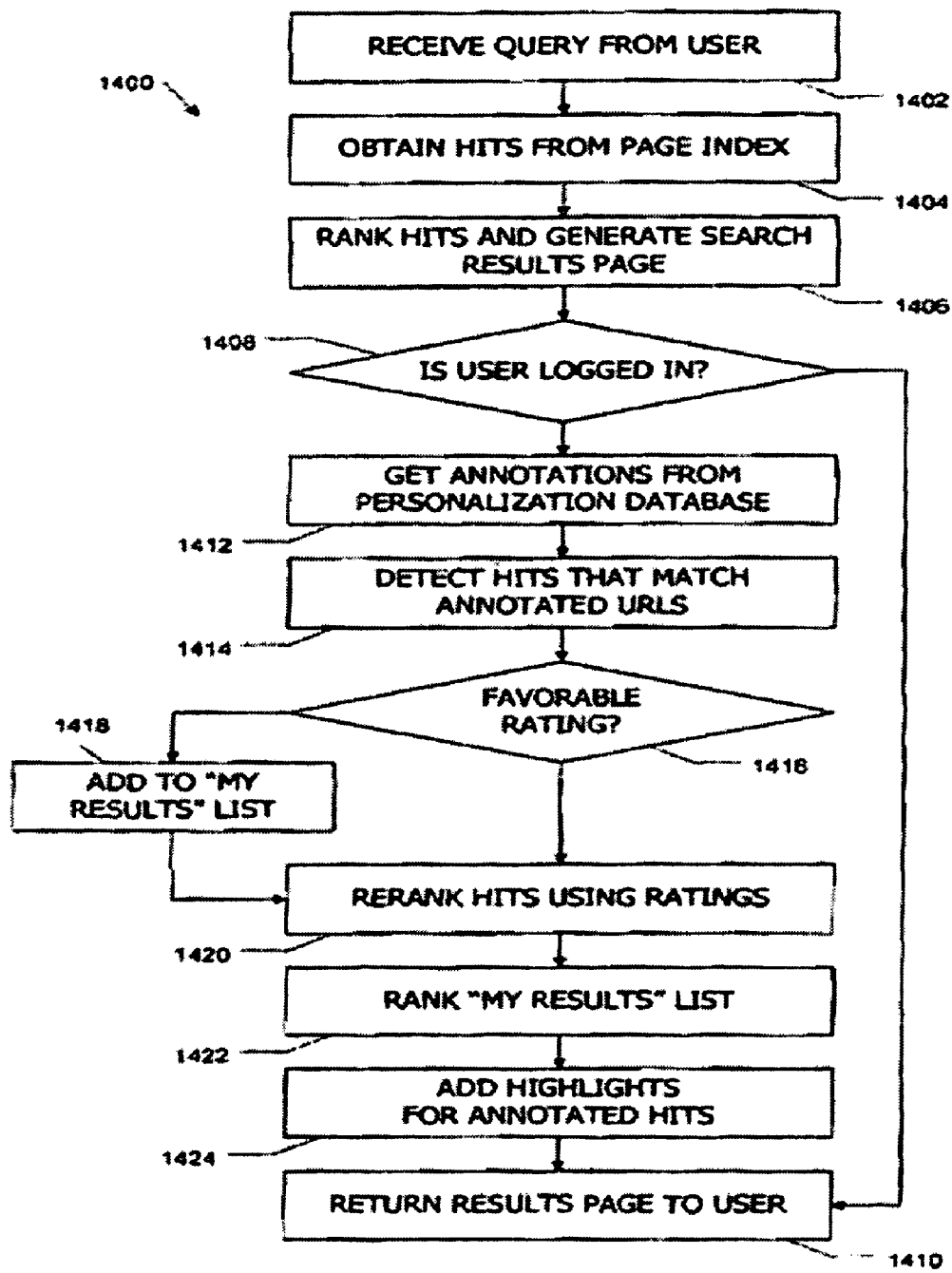
FIG. 14 is a flow diagram of a process for executing a search according to an embodiment of the present invention.

FIG. 14 is a flow diagram of a process 1400 that maybe implemented in query processing module 162 (FIG. 2A) for incorporating a user's previously stored annotations into a response to a current query from that user. At step 1402, the query is received. At step 1404, a list of hits corresponding to the query is obtained, e.g., from page index 170 (FIG. 2A). At step 1406, query processing module 162 ranks the hits, e.g., using conventional algorithms.

At step 1408, query processing module 162 determines whether the user is logged in. If not, query processing module 162 may send the results page to the user without personalization at step 1410, enabling users to perform searches and obtain results without logging in to (or even being registered with) search server 160. If the user is logged in, then the results page is customized for that user based on information in personalization database 166.

More specifically, at step 1412, query processing module 162 provides the user's ID to personalization database 166 and retrieves the annotations created by that user. At step 1414, the URLs of the retrieved annotations are compared to URLs of the hits to detect any hits that match URLs for which the user has previously created annotations. For annotations whose host flag is set to "site," a match (also referred to herein as a "partial match") is detected if the beginning portion of the hit URL matches the URL (or partial URL) stored in the annotation (e.g., in URL field 308 in FIG. 3A). If the host flag is set to "page," an "exact" match between the URL of the annotation and the hit URL is required. For each partial or exact match, it is determined at step 1416 whether the annotation includes a favorable rating, e.g., by reference to "rating" field 328 of annotation 300. If so, then the hit is added to the favored results ("My Results") list at step 1418. In other embodiments, all annotated hits, regardless of any rating, might be added to the "My Results" list.

At step 1420, after comparisons between hits and annotations are completed, the results list is optionally reranked using ratings contained in the annotations. For example, a base score can be generated for each hit (whether it has an annotation or not) using a conventional ranking algorithm. For hits that have an annotation with a favorable or unfavorable rating, a "bonus" can be determined from the rating. The bonus is advantageously defined such that favorably rated sites tend to move up in the rankings while unfavorably rated sites tend to move down. For instance, if low scores correspond to high rankings, the bonus for a favorable rating may be defined as a negative number and the bonus for an unfavorable rating as a positive number. In some embodiments, partial URL matches may be given a smaller bonus than exact URL matches. Unrated (or neutrally rated) hits would receive no bonus. This bonus can be added (algebraically) to the base score to determine a final score for each hit, and reranking can be based on the final score.

In some embodiments, reranking at step 1420 may also include dropping any hits that match unfavorably rated pages or sites from the list of hits to be displayed. In such embodiments, the search results page delivered to the user may include an indication of the number of hits that were dropped due to unfavorable ratings and/or a "Show all hits" button (or other control) that allows the user to see the search results displayed with the unfavorably rated hits included. In another variation, the user can click on a link to see just the unfavorably rated hits.

At step 1422, the "My Results" list is ranked and added to the search results page. In some embodiments, this ranking may be based on the base score or final score described above. In other embodiments, hits in the "My Results" list are sorted by user rating; hits with the same rating may be further sorted according to the base score described above. At step 1424, the search results page is modified to indicate the existence of any annotations; e.g., highlighting and/or "Show My Comments" buttons may be added to the annotated hits. The modified search results page, in this case including the personalized "My Results" section, is sent to the user at step 1410.

It will be appreciated that the process described herein is illustrative and that variations and modifications are possible. Steps described as sequential may be executed in parallel, order of steps may be varied, and steps may be modified or combined. In some embodiments, some or all of the content of the annotation might be displayed in-line in the search results page prior to viewer action. For instance, a visual highlighting element that indicates a favorable or unfavorable rating can be displayed, or the user's keywords or description might appear under the automatically generated abstract, and so on. Where the annotation's content is displayed in-line, a "Show My Comments" button (or other control element allowing the user to view the annotation) may be omitted.

In other embodiments, a user's annotations may be used to identify hits during a search operation. For example, in addition to searching page index 170, query response module 162 may also search selected fields of the user's annotations using some or all of the same search terms used to search page index 170. In one such embodiment, the keywords and description fields of the annotations are searched, and an annotated page is identified as a hit if the search terms appear in one of these fields, regardless of whether the annotated page was identified as a hit in the search of page index 170.

In still other embodiments, inferences can be made about the relative importance of different annotations (or different annotated pages) to the user and used in organizing the presentation of the search hits. For example, it may be inferred that annotated pages that the user accesses more frequently are more valuable to that user than pages accessed less frequently. Thus, when one of the user's most frequently accessed pages appears in a search result, that page might be displayed more prominently (e.g., moved up in the rankings), marked with a special indication distinct from the normal annotated page indicator, or included in a special "favorites" area.

In some embodiments, the annotations used in responding to a query may be limited to a subset of the user's annotations. For instance, only annotations in folders for which the active flag is set to "true" might be used for identifying hits and/or highlighting results.

B. Search in the User's Library

In other embodiments, the user can search her personal library of annotated content rather than the entire Web. For example, "My Library" page 500 of FIG. 5 includes a "Search My Library" button 540 that can be used to initiate a search of the user's library. Although not explicitly shown, a similar button can also be included on toolbar 706 of FIG. 7A. Activating a "Search My Library" button advantageously launches a library search interface page via which queries can be directed to the user's library.

Figure 15:
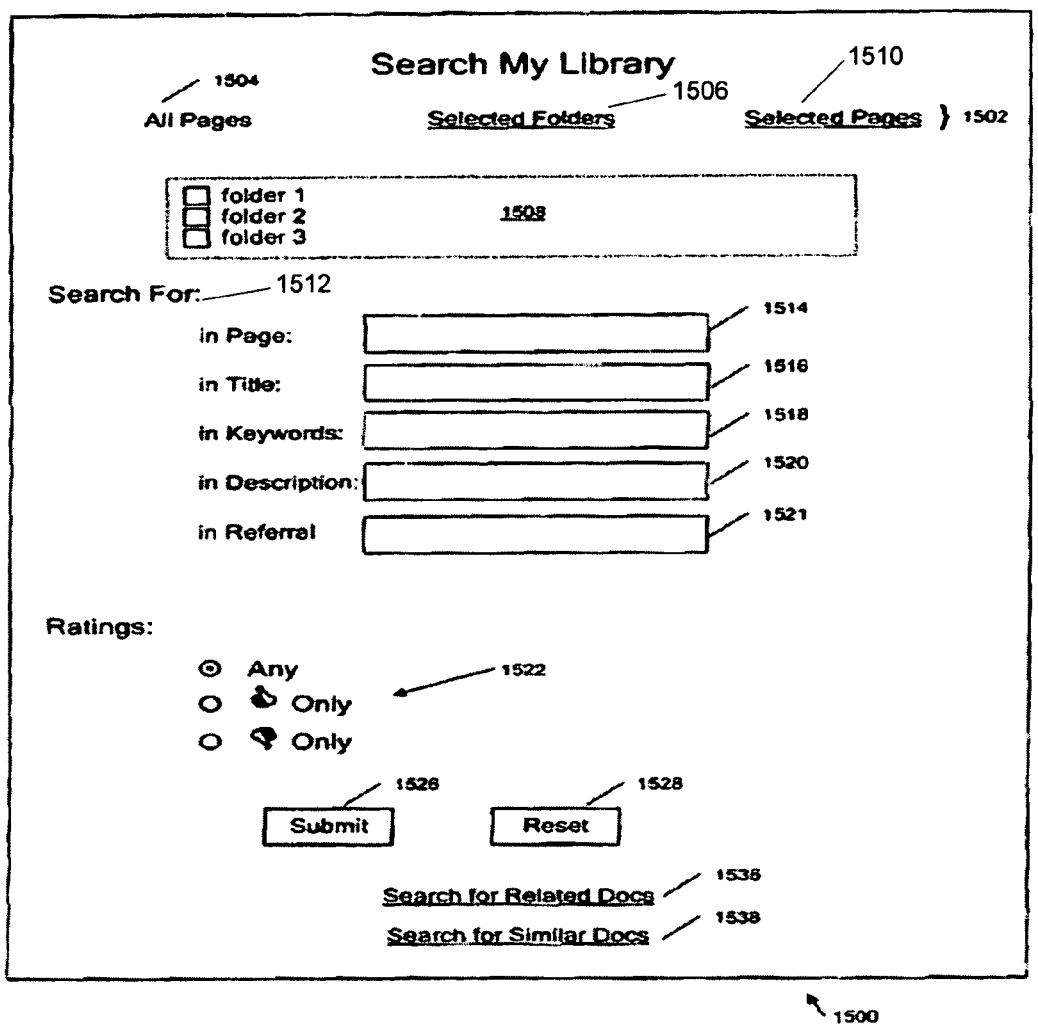
FIG. 15 is an example of a search interface page for searching a library of annotations according to an embodiment of the present invention.

FIG. 15 is an example of a library search interface page 1500 according to an embodiment of the present invention. Page 1500 provides a user interface for field-specific searching within all of the user's library of annotated pages or sites or within any subset of the user's library. Scope section 1502 supports selection of the pages to search. In this instance "All Pages" option 1504 (which may be the default) is selected (as shown by not being underlined), and all pages that the user has annotated will be searched. If "Selected Folders" option 1506 is chosen, area 1508 would provide a list of folders with each folder having a checkbox or other selection/deselection toggle. Similarly, if "Selected Pages" option 1510 is chosen, area 1508 would provide a list of annotated pages (which may be initially displayed as an expandable list of folders) with each page having a checkbox or other independent selection/deselection toggle. Pages can be identified by title, URL, or any other field(s) from the user annotation. In another embodiment, the user may opt to search only those portions of the library (folders and/or individual annotations) for which the "active" flag is set to true or to search all library contents without regard to the active flag.

Query section 1512 provides various text boxes into which the user can enter search terms for searching page content and/or searching particular fields in the annotation. In this example, the user can separately specify search terms for the page content (box 1514), annotation title (box 1516), keywords field (box 1518), description (box 1520), and/or referral (box 1521). Radio buttons 1522 can be used to constrain a rating of the hits. By default, "Any rating" is selected, so that the rating (or absence thereof) does not limit the search; the user can opt to limit the search, e.g., to hits with favorable ratings or to hits with unfavorable ratings. "Search" button 1526 submits the query for processing, and "Reset" button 1528 clears all fields in query section 1512.

Processing of the search depends on which boxes in query section 1512 provide search terms. Where the page content is to be searched, data can be obtained either from page index 170 or from the annotation in personalization database 166 if a representation of the page content is stored therein. Other fields are searched using the user's annotations in personalization database 166. It is to be understood that the user may leave some or all of the boxes in section 1512 empty; where a box is empty, the corresponding field is not used to constrain the search. For example, the user could search the page content of her annotated pages by entering search terms in box 1514 and leaving the other boxes empty; the actual search could be performed using page index 170, with any hits that do not correspond to an annotated page or site being discarded before transmitting the results to the user. Results of the search are advantageously delivered using a search result page similar to page 1200 (FIG. 12) described above, except that in searches limited to the user's library, every page has an annotation.

The query interface may be varied. For example, in another interface, a single text box is provided, and the user is prompted to select whether search terms in the text box should be searched in the page contents and/or in various fields of the annotation record (e.g., title, keywords, description, and/or other fields). In still another embodiment, a "basic" search interface with a single text box is provided by default, and the search is performed over the page content and the annotation fields. The user can accept this basic search configuration or opt to view query section 1512 (or another query interface) to perform a more advanced search. Other query interfaces and combinations of interfaces are also possible.

In embodiments where users can search their annotations by keywords, a user can advantageously develop a personalized keyword scheme for indexing content she discovers on the Web. Using the search and/or toolbar-based interfaces described above, the user can, by creating an annotation, assign keywords to any page she finds interesting and add the page to her personal library. Later, the user can search using the keywords field to find the pages in her library related to a particular subject. Thus, searchable annotations provide a powerful tool for individual users to organize and classify Web content in a manner that is useful to them.

It will be appreciated that search page 1500 is illustrative and that variations and modifications are possible. In some embodiments, search page 1500 may also be accessible via a button on a toolbar or other suitable element of a persistent user interface, or from a search provider's main page. If a user who is not logged in to search server 160 attempts to access page 1500, the user may be prompted to log in before page 1500 is displayed.

C. Search for Related or Similar Pages

In some embodiments, users can also search for other documents (e.g., pages or sites) that are similar to or related to pages or sites in their libraries. "Similar" documents are documents that contain content meeting some similarity criterion relative to an annotated page. Examples of similarity criteria include: having some number of words, phrases, or other multi-word units in common; having similar patterns of occurrence of words, phrases or other multiword units; belonging to the same category or closely related categories in a system-defined taxonomy; or the like. Algorithms for determining similarity between two pages are known in the art and may be used with the present invention. "Related" documents share portions of a URL (e.g., at least a domain name) with the rated page; again, known algorithms for determining relatedness may be used.

In one embodiment, from search page 1500 (FIG. 15), the user can select all or any subset of her annotated pages using scope section 1502 as described above, then activate button 1538 to search for similar documents or button 1536 to search for related documents. Searches for similar or related documents are advantageously not limited to annotated pages or sites and can be performed by search server 160 using page index 170. In some embodiments, searches for related or similar pages can also include search term qualifiers, and search terms may be specified using query section 1512 as described above or other interfaces. In some embodiments, the relative frequency with which a user accesses different annotated pages within the selected subset can be used to assign different weights to different annotated pages in the active subset for purposes of determining which other documents are most similar or most closely related to the selected documents; more frequently accessed pages are advantageously assigned a higher weight than less frequently accessed pages.

D. Iterative Search Using Annotations

The above-described techniques can be leveraged to support iterative search workflows in which users can filter annotated pages or sites to create subsets and perform further filtering on the subset. For example, the folders available to a user may include a "Working" folder that is automatically created and used to support iterative search. A user may search all of her annotated pages (e.g., by using search interface 1512 of page 1500) with a desired query term in Referral box 1521. The user can then review the results and save any interesting ones to the "Working" folder, with or without filling in the various annotation fields. In one embodiment, search results page (see FIG. 12) may also include an "Add to Working Folder" button.

In another embodiment, the "Working" folder can also be populated as the user navigates the Web using the browser. For instance, an "Add to Working Folder" button may be provided via a toolbar (e.g., toolbar 706 of FIG. 7A) or other persistent interface. The user may also be able, via a suitable interface, to move or copy annotation records from other folders to the Working folder and to edit the contents of the Working folder directly (e.g., via page 500 of FIG. 5). In still another embodiment, the user initially searches the entire Web using some query, then populates the "Working" folder from the search results page, e.g., by adding some or all of the hits to the folder. An interface element to empty the "Working" folder may be included in page 500, or in a toolbar or other persistent interface as desired.

After populating the "Working" folder, the user can execute a further, query, e.g., via page 1500 of FIG. 15, selecting just the "Working" folder. In some embodiments, the user can save all of the results of a search in the "Working" folder to some other folder (which may be, e.g., a new user-created folder) by activating an appropriate interface button. These results are available for browsing or further searching, In some embodiments, the user may save searches conducted on the "Working" folder as filters that can be applied to other pages or search results.

E. Toolbar Enhancements

In some embodiments, a browser toolbar, such as toolbar 700 (FIG. 7A) described above, can be enhanced based on user annotations. For example, as described above, toolbar 700 advantageously provides a "Show My Comments" button 714 that indicates whether the user has already annotated the current page and that allows the user to view her annotation, e.g., in a pop-up window or overlay as shown in FIG. 13 and described above. Annotations can also be displayed in-line in the annotated page.

In other embodiments, further toolbar enhancements are provided. For instance, in some embodiments, annotations are integrated with a "Bookmark" feature. As is known in the art, browser toolbar add-ins provided by some Internet portal providers include a "Bookmark" feature that allows registered users of the portal service to save bookmarks to pages as they browse. Each bookmark generally includes the URL and, in some instances, a page title. The user can access her bookmarks using any Web browser client that has the toolbar add-in installed, provided that the user first logs in to search server 160.

Annotations, in some aspects, can be used as enhanced bookmarks. Instead of just bookmarking a page, the user can save additional information (metadata) about the bookmarked page, such as keywords, ratings, or other descriptive and/or evaluative information. This information may, for instance, remind the user of what she thought was interesting or worthwhile about the page or site in question. Further, instead of trying to remember which of tens or hundreds of bookmarked page included a particular item of information, the user can search her library of annotations to find a desired page.

In some embodiments, a list of conventional bookmarks for the user is automatically generated from her library of annotated pages or sites (or just from those annotated pages or sites with a favorable rating). The user can choose not to enter any content when creating a new an annotation; in this case, the annotation would operate essentially as a conventional bookmark.

F. User Preferences

In some embodiments, registered users may be able to control the uses made of their annotation data. For example, "My Library" page 500 (FIG. 5) may include an "Options" button 550. Button 550 advantageously links to a preferences page (not explicitly shown) that enables the user to specify her preferences for various annotation-related features. Examples include whether the user's ratings should or should not be considered in generating search results, whether "global ratings" (described below) should be considered in generating search results, whether and how any of the user's annotations are to be published, and so on.

User preferences for these and any other options are advantageously stored in personalization database 166 and applied whenever the user logs in. In some embodiments, buttons and options controllable from search results pages (e.g., as described above) may temporarily override the user preferences specified via a user preferences page; the original preferences can be restored for the next query or the next time the user logs in.

V. Aggregation of Annotation Data

In some embodiments, search server 160 uses aggregated annotation data across the entire community of registered users to enhance the search experience for all users. Examples will now be described.

A. Global Ratings

For example, the ratings assigned to a page or site by different users can be averaged or otherwise aggregated to generate a "global" rating for that page or site. In one such embodiment, search server 160, or another server operated under common control with search server 160, periodically (e.g., once per day) executes an algorithm that searches the annotations in personalization database 166 by URL to collect all ratings that any user might have assigned to the page or site having that URL. These ratings are then averaged or combined in some other manner to determine a global rating for the page or site. The global rating may be cached, e.g., in page index 170.

Global ratings may be used in various ways. In one embodiment, the global rating of a page or site may be used as a factor in the search-results ranking algorithm when the URL of the page or site matches a hit for a given search. In another embodiment, the global rating may be displayed next to each hit on a search results page, along with the user's own rating (if the user has given one), regardless of whether the global rating is used in the page ranking.

In some embodiments, the user may have the option to show or hide global ratings, and/or to use or ignore global ratings when ranking search hits. Controls for such options may be included on a search results page or on a user preferences page as described above.

B. Folksonomy

As another example, aggregated annotation data may be used to classify or categorize Web content to create a "folksonomy." As used herein, a "folksonomy" refers to a system of classification for content that is based on and reflective of the way in which a community of users chooses to describe and classify the content. In embodiments where annotations include keywords (or labels), the pattern of keywords assigned to a particular page will tend to be indicative of its content. For instance, if 50% of the users who annotated a particular page used the keyword "cycling," then it can be inferred that the page relates to cycling.

In one such embodiment, search server 160, or another server operated under common control with search server 160, periodically (e.g., once per day) executes an algorithm that searches the annotations in personalization database 166 by URL to find all keywords that have been used to annotate that URL by registered users. Search server 160 analyzes the patterns of keywords to determine a set of "folksonomy keywords" for the page. This set may include, e.g., the most frequently used keywords (e.g., up to 5 or 10 or some other maximum number), the most recently used keywords, or the like. In some embodiments, a combination of frequency and recency is used to select the folksonomy keywords. Folksonomy keywords for a particular page can be added to page index 170 in association with the URL and used in responding to subsequent searches. For instance, a URL might be returned as a hit for any query (from any user) if one of the folksonomy keywords for the URL matches a search term of the query, regardless of whether the page content actually includes any of the search terms. Ranking of hits may depend in part on whether the search terms matched page content, folksonomy keywords, or both.

In some embodiments, users (either registered users or all users) can choose whether to search the folksonomy keywords instead of or in addition to page content.

C. Identifying User Interests

User annotations may also be used by the search provider (e.g., the owner of search server 160) to develop user profiles. For example, annotated pages or sites may be classified into categories using various proprietary or non-proprietary classification schemes, including the folksonomy keywords described above, or they may be classified based on the keywords a particular user has assigned. By analyzing the categories to which a user's various rated pages or sites belong, the search provider can identify subjects in which the user is particularly interested. For instance, if a user has annotated many pages that belong to a single category, it can be inferred that the user is generally interested in content in that category. The search provider may also use statistics about which annotated pages the user visits most often as a further aid in identifying a user's interests.

The search provider can use information about a user's interests gleaned from the annotations in various ways to enhance the user's experience. In one embodiment, knowledge of a particular user's interests can be used to resolve ambiguities in search queries received from that user, including queries for which the search is to be conducted over the entire Web and/or queries for which the search (or search hits) is limited to the user's library. For instance, the term "jaguar" in a search query might refer to an automobile or to an animal. If the user has annotated relatively many sites related to automobiles and relatively few related to animals, it can be inferred that this user is more likely interested in the automobile than the animal. This information can be used to enhance the likelihood that information relevant to the user's actual interest will receive prominent placement in the search results, e.g., by adjusting page rankings based on whether the page relates to an identified user interest.

As another example, knowledge of a particular user's interests can be used to customize Web content for delivery to that user. In one embodiment, a user's interests can be used in determining how to arrange content on a Web page; for example, a news page requested by a user might be arranged so that stories related to that user's known interests appear first. In another embodiment, a user's interests are taken into account when selecting sponsored content (e.g., advertisements) for displaying on a Web page. Other types of customization based on a known interest of a particular user can also be performed.

Information about user interests obtained from annotations can also be aggregated across subgroups of users (e.g., all users, or users fitting some geographic or demographic profile). In situations where the user's identity or particular interests are not known, this aggregate information can be used for purposes such as resolving ambiguity in search queries, selecting and arranging content of a Web page, and so on. In some embodiments, aggregations across different subgroups of users are performed in parallel and used in situations where only partial information about the user (e.g., the user's geographic location or a demographic characteristic) is known.

In other embodiments, a search provider might also use aggregate information about user interests in making other strategic decisions, such as setting advertising rates, determining content or layout of portal pages, and the like.

D. Inferring Opinions

In some embodiments where a user's annotation for one page or site includes a rating, search server 160 can infer the user's likely opinion of other (unannotated) pages or sites from that rating. Such inferences might be based on relatedness of the URL and/or similarity of content between the annotated page and the unannotated page. Similarity of content can be determined, e.g., based on titles, abstracts, patterns of word use in the content, categorization (based on the folksonomy keywords or other classification schemes), etc. The unannotated page can be assigned an inferred rating, e.g., based on the user's average rating of annotated pages or sites that are determined to be similar.

Where inferred ratings are used to rank search hits, the inferred ratings should be accorded less weight than direct ratings, reflecting uncertainty about the inference. For example, if a user gave a negative rating to page or site X, the same rating might be inferred for another page or site Y that is similar to or related to page or site X. The direct negative rating might cause page or site X to be removed from the search result list, while the inferred negative rating of page or site Y might result in page or site Y being included in the result list but with a lower ranking than it otherwise would have.

In some embodiments, the weight is determined based in part on how many pages (or sites) having that property the user has rated and how consistent the ratings given to such pages are. For instance, if the user has consistently given negative ratings to a large number of pages belonging to a particular category, the inferred negative rating of an unannotated page belonging to that category might be weighted more strongly than if the user had given ratings to only one or two pages in that category.

In another embodiment, the weight is also based in part on the degree of similarity between the annotated and unannotated pages. For instance, if the pages are nearly identical in content, the inference of a similar rating can be accorded a higher weight than if the similarity is less strong.

VI. Further Embodiments

While the invention has been described with respect to specific embodiments, one skilled in the art will recognize that numerous modifications are possible. For instance, the appearance of various search result and user interface pages or windows may differ from the examples shown herein. Interface elements are not limited to buttons, clickable regions of a page, text boxes, or other specific elements described herein; any interface implementation may be used.

It should also be understood that in its rating-related aspects, the invention is not limited to any particular rating scheme, and some embodiments might offer users the option of choosing among alternative rating schemes (e.g., thumbs up/thumbs down or rating on some scale). In some embodiments, only favorable or neutral ratings might be supported. In other embodiments, ratings might not be collected at all.

Annotations can include any number of fields in any combination and may include more fields, fewer fields, or different fields from those described herein. For example, in some embodiments, the user may be invited to create an abstract or to edit an automatically generated abstract. In another embodiment, the user may be prompted to indicate whether a page or site being annotated belongs to some general category of content, e.g., "adult" or "foreign" or "spam." The user can then choose to include or exclude content in that category during searches. In addition, information about which pages or sites different users have categorized in one or another of these categories can be used to infer that the page or site in question should be treated as such. Thus, for instance, if a large number of users identify a particular page as spam, that page might be excluded from future search results.

Other interfaces for viewing and interacting with annotations may also be provided. For example, in some embodiment, the browsing user's annotation data and/or aggregated annotation data can be automatically displayed (e.g., in line with page content or in an overlay) every time an annotated page is displayed in the user's browser. In one such embodiment, each user may be able to indicate preferences for whether their own annotations, aggregate metadata, or both should be automatically displayed.

As described above, some embodiments allow the user to control whether an annotation should apply to a single page or to a group of pages (a site). In addition, in some embodiments, users might also be able to apply an annotation to all pages registered to the same domain name registrant as the rated page. The existence of a common domain name registrant may be determined using WHOIS or another similar service.

In other embodiments, a provider of search server 160 may also offer sponsored links, in which content providers pay to have links to their sites provided in search results. Sponsored links are usually displayed in a designated section of the results page, segregated from the regular search results. In one embodiment of the present invention, any sponsored links that the user has annotated can also be marked. For instance, a sponsored link might have highlighting to indicate that the user has an annotation for that page, and the user's rating (if any) for the sponsored link might be used in determining the highlighting, just as for the regular search results shown in FIG. 12 above. Sponsored links may also be accompanied by a "Save This" button, a "Show My Comments" button, or similar buttons or interface controls.

The embodiments described herein may make reference to Web sites, URLs, links, and other terminology specific to instances where the World Wide Web (or a subset thereof) serves as the search corpus. It should be understood, however, that the systems and methods described herein can be adapted for use with a different search corpus (such as an electronics database or document repository) and that results or annotations may include content as well as links or references to locations where content may be found.

Computer programs incorporating various features of the present invention may be encoded on various computer readable media for storage and/or transmission; suitable media include magnetic disk or tape, optical storage media such as CD or DVD, flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A computer-implemented method for sharing annotated content with an annotating user, comprising:
   receiving from a user a first set of keywords for annotating content from the annotating user;
   receiving from a user a second set of keywords that designate whether the annotated content annotated by at least one keyword included in the second set of keywords is shared with the annotating user;
   storing in a data store a first association of the first set of keywords with the annotating user, and a second association of to second set of keywords with the annotating user;
   receiving via a client system, which is associated with the annotating user, a keyword selection for a select keyword and an identifier for the annotating user;
   retrieving the first and second associations from the data store;
   determining from the first association and the identifier whether the annotated content from the annotating user is annotated by at least one keyword in the first set of keywords;
   determining from the second association whether the select keyword is included in the second set of keywords; and
   displaying on the client system content annotated by the select keyword if the annotated content from the annotating user is annotated by at least one keyword in the first set of keywords, and if the select keyword is included in the second set of keywords.

2. The method according to claim 1, further comprising receiving from the user a third set of keywords that designate that annotated content annotated by at least one keyword included in the second set of keywords may be shared with the annotating user via selection of a keyword in the second set of keywords.

3. The method according to claim 2, wherein the step of receiving via a client system the keyword selection for the select keyword includes receiving a request to subscribe to content annotated by the select keyword.

4. The method according to claim 3, further comprising subscribing a user page associated with the annotated user to the content annotated by the select keyword.

5. The method according to claim 2, wherein the third set of keywords is a subset of the second set of keywords.

6. The method according to claim 1, further comprising receiving from the user a third set of keywords that designate that annotated content annotated by at least one keyword included in the second set of keywords may not be shared with the annotating user via selection of a keyword in the second set of keywords.

7. The method according to claim 6, wherein the third set of keywords is a subset of the second set of keywords.

8. The method according to claim 1, wherein the user is a human.

9. The method according to claim 1. wherein the user is a computer.

10. The method of claim 1, further comprising:
   determining whether one or more keywords in the second set of keywords are the same as or substantially similar to keywords used by other users to annotate content; and
   suggesting at least one of the other users to the user for annotating with one or more keywords if one or more keywords in the second set of keywords are the same as and/or substantially similar to the keywords used by the other users to annotate content.

11. The method of claim 7, further comprising:
receiving a request from the user to annotate the at least one of the other users; and
annotating the at least one of the other users.

12. A computer-implemented method for transmitting a communication to a set of annotating users, comprising:
displaying a first keyword that annotates a first set of content from a first set of annotating users;
displaying a second keyword that annotates a second set of content from a second set of annotating users, wherein the first set and the second set include a union of content from the annotating users annotated by the first keyword and the second keyword;
receiving a request to transmit a communication to the first set of annotating users via selection of a first keyword;
receiving a request not to transmit the communication to the union of annotating users via selection of the second keyword; and
transmitting the communication to the first set of annotating users exclusive of the union of annotated users.

13. The method according to claim 12, further comprising receiving a selection for a communication type for the communication from a set of communication types.

14. The method according to claim 13, wherein the set of communication types includes e-mail, text messaging, and/or telephonic messaging.

15. A computer implemented method for subscribing a page to annotated content, comprising:
receiving from a first user a first set of keywords for annotating annotated content from a second user;
receiving from the first user a second set of keywords that designate whether annotated content annotated by at least one keyword included in the second set of keywords is shared with the second user;
receiving via a client system, which is associated with the second user, a keyword selection for a select keyword that annotates a select piece of content;
receiving via the client system a request to subscribe to annotated content annotated by the select keyword; and
subscribing a page associated with the second user to the select piece of content annotated by the select keyword if the content of the second user is annotated by at least one keyword in the first set of keywords and if the select keyword is in the second set of keywords.

16. The method according to claim 15, further comprising determining whether the annotated content of the second user is annotated by at least one keyword in the first set of keywords, and whether the select keyword is in the second set of keywords.

17. The method according to claim 15, wherein the select piece of content that is annotated by the select keyword includes syndicated content.

18. The method according to claim 17, wherein the syndicated content is associated with an RSS feed.

19. The method according to claim 17, further comprising displaying a syndication feed for the select piece of content on the page if the second user visits the page.

* * * * *